United States Patent
Numata et al.

(10) Patent No.: US 10,832,119 B2
(45) Date of Patent: Nov. 10, 2020

(54) INTERACTIVE AGENT FOR IMITATING AND REACTING TO A USER BASED ON USER INPUTS

(71) Applicant: Hitachi, Ltd., Tokyo (JP)

(72) Inventors: Takashi Numata, Tokyo (JP); Yasuhiro Asa, Tokyo (JP); Toshinori Miyoshi, Tokyo (JP); Hiroki Sato, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 86 days.

(21) Appl. No.: 15/903,640

(22) Filed: Feb. 23, 2018

(65) Prior Publication Data
US 2018/0357526 A1    Dec. 13, 2018

(30) Foreign Application Priority Data

Jun. 8, 2017  (JP) .................................. 2017-113177

(51) Int. Cl.
*G06N 3/00*   (2006.01)
*G06F 3/01*   (2006.01)
(Continued)

(52) U.S. Cl.
CPC ............. *G06N 3/008* (2013.01); *G06F 3/011* (2013.01); *G06F 3/015* (2013.01); *G06F 3/017* (2013.01);
(Continued)

(58) Field of Classification Search
CPC ........ G06F 3/011; G06F 3/017; G06F 3/0484; G06K 9/00342; G10L 15/07; G06N 3/008
See application file for complete search history.

(56) References Cited

U.S. PATENT DOCUMENTS

| 5,029,214 | A  | * | 7/1991 | Hollander | ................ | A63H 3/28 446/175 |
| 6,728,679 | B1 | * | 4/2004 | Strubbe   | .................. | G06F 3/011 704/270.1 |

(Continued)

FOREIGN PATENT DOCUMENTS

| JP | 2001-325052 A | 11/2001 |
| JP | 2011-33837 A  | 2/2011  |

(Continued)

OTHER PUBLICATIONS

Cassell, Justine, "Embodied Conversational Agents Representation and Intelligence in User Interfaces," AI Magazine, American Association for Artificial Intelligence, Winter 2001, pp. 67-84. (Year: 2001).*

(Continued)

*Primary Examiner* — Eric J. Bycer
(74) *Attorney, Agent, or Firm* — Crowell & Moring LLP

(57) ABSTRACT

In order to provide an interactive interface that arouses a user's sympathy and realizes a continuous interaction having much information, an interactive system of providing the interactive interface of performing an interaction with a user includes a computer and a measurement device of measuring a signal related to a user's speech. The computer calculates a first feature amount indicating feature of a user action in the speech of the user, based on the signal measured by the measurement device, calculates a second feature amount that is a control value of a response action to the user performed by the interactive interface, based on the first feature amount, calculates a control time of adjusting a timing of controlling the response action depending on the type of the response action, and controls the interactive interface, based on the second feature amount and the control time.

9 Claims, 15 Drawing Sheets

(51) Int. Cl.
- *G06K 9/00* (2006.01)
- *G10L 15/07* (2013.01)
- *G10L 13/027* (2013.01)
- *G10L 25/51* (2013.01)
- *G10L 15/22* (2006.01)
- *G06F 3/0484* (2013.01)
- *G06N 20/00* (2019.01)

(52) U.S. Cl.
CPC ....... *G06F 3/0484* (2013.01); *G06K 9/00342* (2013.01); *G06K 9/00664* (2013.01); *G10L 13/027* (2013.01); *G10L 15/07* (2013.01); *G10L 15/22* (2013.01); *G10L 25/51* (2013.01); *G06F 2203/011* (2013.01); *G06K 9/0061* (2013.01); *G06K 9/00228* (2013.01); *G06K 9/00362* (2013.01); *G06N 20/00* (2019.01); *G10L 2015/223* (2013.01)

(56) References Cited

U.S. PATENT DOCUMENTS

| | | | | |
|---|---|---|---|---|
| 6,731,307 | B1* | 5/2004 | Strubbe | G06N 3/004 704/E17.002 |
| 7,136,818 | B1* | 11/2006 | Cosatto | G10L 15/1807 704/275 |
| 8,165,282 | B1* | 4/2012 | Coughlan | H04M 3/523 379/265.11 |
| 9,792,825 | B1* | 10/2017 | Fanty | G09B 5/125 |
| 2001/0043233 | A1 | 11/2001 | Sato et al. | |
| 2002/0008716 | A1* | 1/2002 | Colburn | G06T 13/40 715/706 |
| 2008/0235581 | A1* | 9/2008 | Caporale | A63F 13/12 715/706 |
| 2008/0259085 | A1* | 10/2008 | Chen | G06T 13/205 345/473 |
| 2009/0055190 | A1* | 2/2009 | Filev | B60W 50/10 704/270 |
| 2009/0174691 | A1* | 7/2009 | Yeo | G09G 3/2096 345/204 |
| 2011/0131041 | A1* | 6/2011 | Cortez | G06T 13/205 704/235 |
| 2015/0314454 | A1* | 11/2015 | Breazeal | B25J 9/0003 700/259 |

FOREIGN PATENT DOCUMENTS

| | | |
|---|---|---|
| JP | 2012-181697 A | 9/2012 |
| JP | 2013-154458 A | 8/2013 |
| JP | 2016-38501 A | 3/2016 |
| WO | WO 2017/085992 A1 | 5/2017 |

OTHER PUBLICATIONS

Japanese-language Office Action issued in Japanese Application No. 2017-113177 dated Jul. 21, 2020 with English translation (six (6) pages).

* cited by examiner

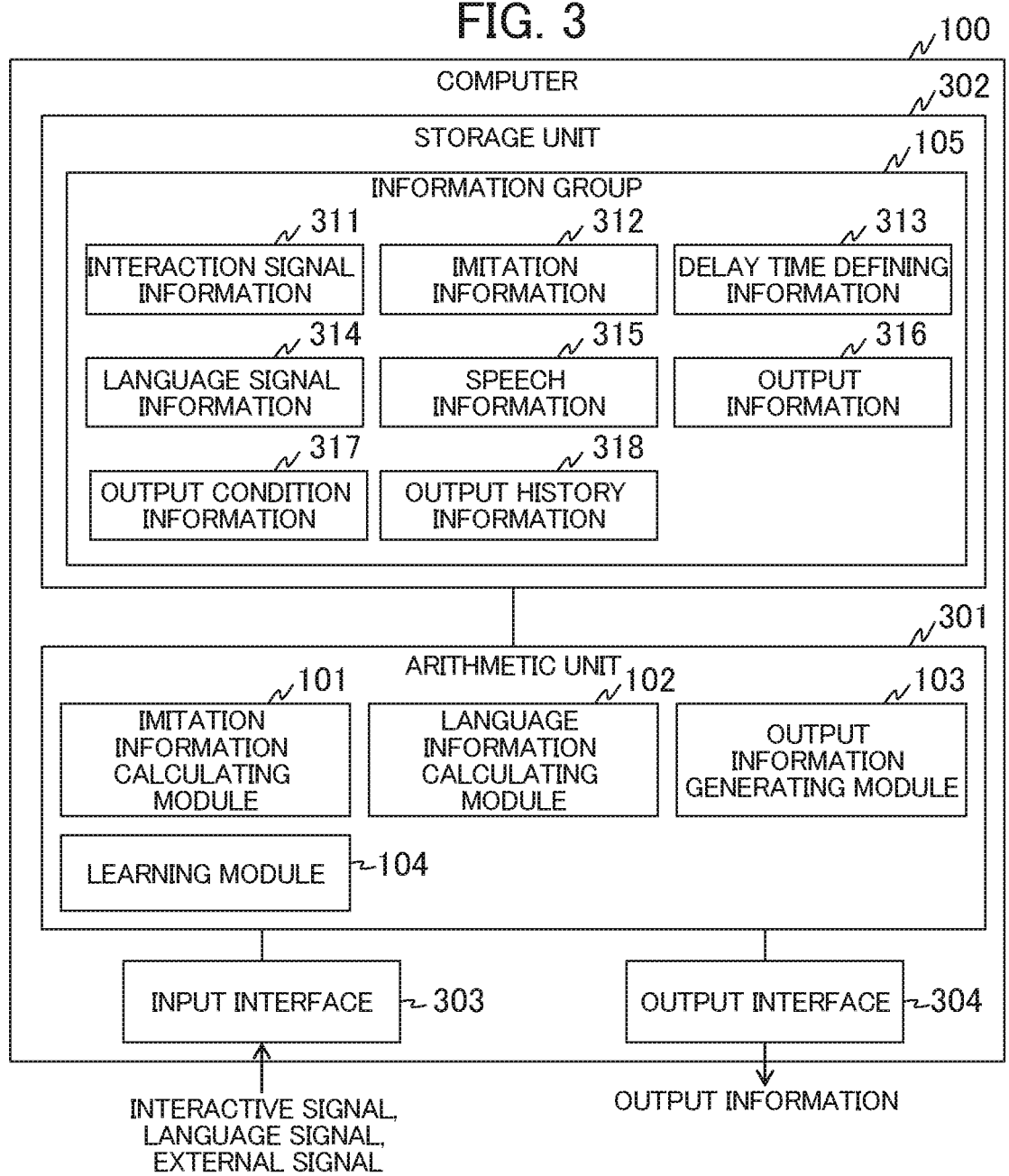

FIG. 5

IMITATION INFORMATION 312

| 501 | 502 | 503 | 504 | 505 | 506 | 507 | 508 | 509 |
|---|---|---|---|---|---|---|---|---|
| ID | REFERENCE ID | IMITATION FEATURE AMOUNT TYPE | IMITATION FEATURE AMOUNT | DELAY TIME | INTERACTION DATA NAME | INTERACTION DATA | INTERACTION FEATURE AMOUNT TYPE | INTERACTION FEATURE AMOUNT |
| 1 | 1 | MOVEMENT OF EYEBALLS | (15,20) | 0.3 | EYEBALL IMAGE | [(1,1),46];... | VISUAL LINE | (10,168) |
| 2 | 1 | FACIAL MOVEMENT | 150 | 0.8 | FACE IMAGE | [(1,1),64];... | FACIAL DIRECTION | 134 |
| 3 | 1 | PHYSICAL MOVEMENT | 40 | 2.5 | PHYSICAL IMAGE | [(1,1),3];... | PHYSICAL MOVEMENT | 65 |

FIG. 6

DELAY TIME DEFINING INFORMATION 313

| ID | IMITATION FEATURE AMOUNT TYPE | DELAY TIME |
|---|---|---|
| 1 | MOVEMENT OF EYEBALLS | 0.3 |
| 2 | FACIAL MOVEMENT | 0.8 |
| 3 | PHYSICAL MOVEMENT | 2.5 |

LANGUAGE SIGNAL INFORMATION 314

| ID | SIGNAL NAME | ACQUISITION TIME | POINTER |
|---|---|---|---|
| 1 | MEASUREMENT DEVICE 1 | 0.1 | zzz.zzz.zzz |
| ⋮ | ⋮ | ⋮ | ⋮ |

SPEECH INFORMATION 315

| INPUT SPEECH CONTENTS | REFERENCE ID | OUTPUT SPEECH CONTENTS |
|---|---|---|
| WHAT'S THE DATE TODAY? | 1 | IT'S MARCH 27 TODAY. |
|  | 2 | YOU WILL ENJOY CHERRY BLOSSOMS IN TWO DAYS IN TOKYO. |
|  | ⋮ |  |

801, 802, 803

FIG. 9
OUTPUT INFORMATION 316

| OUTPUT DEVICE | OUTPUT VALUE | DELAY TIME |
|---|---|---|
| DISPLAY | MOVEMENT OF EYEBALLS (15,20) | 0.3 |
| ⋮ | ⋮ | ⋮ |
| SPEAKER | IT'S MARCH 27 TODAY. YOU WILL ENJOY CHERRY BLOSSOMS IN TWO DAYS IN TOKYO. | 0 |

FIG. 10
OUTPUT CONDITION INFORMATION 317

| ID | ACTION TYPE | CONDITION |
|---|---|---|
| 1 | MOVEMENT OF EYEBALLS | USER'S SPEECH CONTENTS ARE "YES" OR "NO" AND THE OUTPUT SPEECH CONTENTS ARE "YES" OR "NO" CONDITION PRIORITY |
| ⋮ | ⋮ | ⋮ |

FIG. 11
OUTPUT HISTORY INFORMATION 318

| ID | SYMPATHY DEGREE | OUTPUT VALUE | DELAY TIME |
|---|---|---|---|
| 1 | 20 | IT'S MARCH 27 TODAY. YOU WILL ENJOY CHERRY BLOSSOMS IN TWO DAYS IN TOKYO. | 0 |
| | | ⋮ | ⋮ |
| | | MOVEMENT OF EYEBALLS (15,20) | 0.25 |
| 2 | 80 | IT'S MARCH 28 TODAY. AS IT IS LIKELY TO RAIN, PLEASE TAKE AN UMBRELLA. | 0 |
| | | ⋮ | ⋮ |
| | | MOVEMENT OF EYEBALLS (12,36) | 0.3 |
| ⋮ | ⋮ | ⋮ | ⋮ |

DELAY TIME DEFINING INFORMATION 313

| ID | IMITATION FEATURE AMOUNT TYPE | DELAY TIME RANGE | |
| --- | --- | --- | --- |
| | | MINIMUM VALUE | MAXIMUM VALUE |
| 1 | MOVEMENT OF EYEBALLS | 0.28 | 0.32 |
| 2 | FACIAL MOVEMENT | 0.77 | 0.83 |
| 3 | PHYSICAL MOVEMENT | 2.45 | 2.55 |

1501　　1502　　1503

FIG. 17
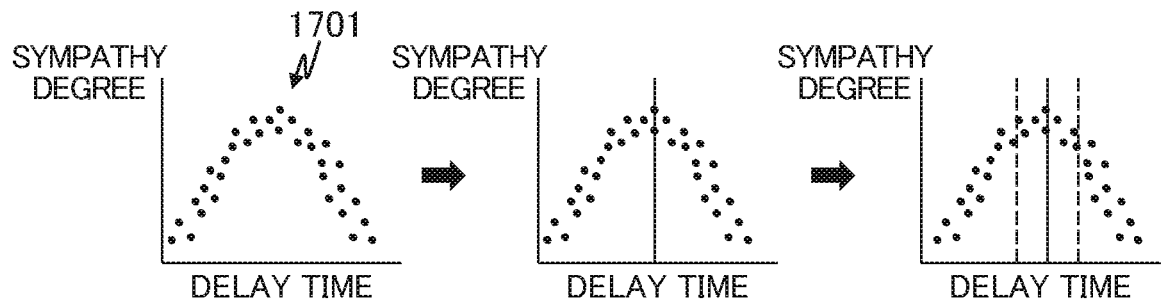
FIG. 18
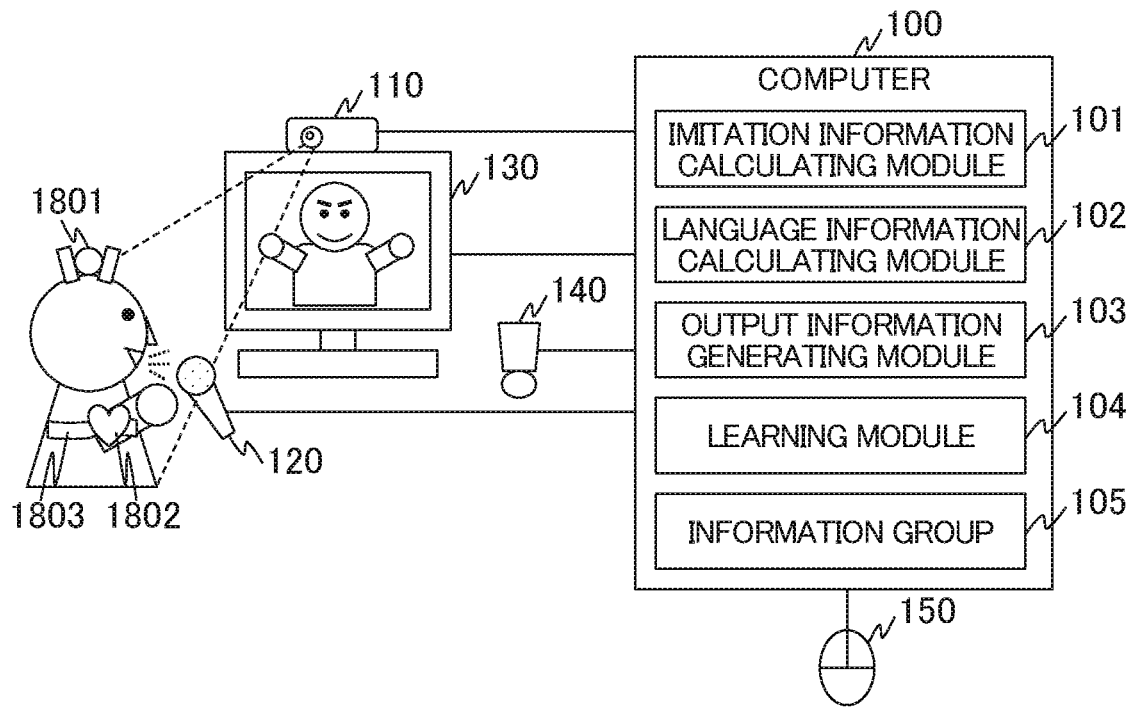
FIG. 19
BIOLOGICAL SIGNAL INFORMATION 1900
| ID | SIGNAL NAME | ACQUISITION TIME | POINTER |
|---|---|---|---|
| 1 | PERSPIRATION AMOUNT MEASURING DEVICE | 0.1 | zzz.zzz.zzz |
| ⋮ | ⋮ | ⋮ | ⋮ |

OUTPUT INFORMATION 316

| OUTPUT DEVICE | OUTPUT VALUE | DELAY TIME | SYMPATHY DEGREE |
|---|---|---|---|
| DISPLAY | MOVEMENT OF EYEBALLS (15,20) | 0.3 | 30 |
| ⋮ | ⋮ | ⋮ | |
| SPEAKER | IT'S MARCH 27 TODAY. YOU WILL ENJOY CHERRY BLOSSOMS IN TWO DAYS IN TOKYO. | 0 | |

FIG. 22

| | INTERACTION SIGNAL TYPE | INTERACTION DATA TYPE | INTERACTION FEATURE AMOUNT TYPE |
|---|---|---|---|
| ● INTERACTION FEATURE AMOUNT 1 | IMAGE | EYEBALL IMAGE | VISUAL LINE |
| ● INTERACTION FEATURE AMOUNT 2 | IMAGE | FACE IMAGE | FACIAL DIRECTION |
| ● INTERACTION FEATURE AMOUNT 3 | IMAGE | WHOLE BODY IMAGE | PHYSICAL DIRECTION |

INTERACTION FEATURE AMOUNT : 3

IMITATION FEATURE AMOUNT : 3

| | IMITATION FEATURE AMOUNT TYPE | INTERACTION FEATURE AMOUNT TYPE | DELAY TIME |
|---|---|---|---|
| ● IMITATION FEATURE AMOUNT 1 | VISUAL LINE | VISUAL LINE | 0.3 |
| ● IMITATION FEATURE AMOUNT 2 | FACIAL DIRECTION | FACIAL DIRECTION | 0.8 |
| ● IMITATION FEATURE AMOUNT 3 | PHYSICAL MOVEMENT | PHYSICAL MOVEMENT | 2.5 |

CONDITION : 1

| | IMITATION FEATURE AMOUNT TYPE | CONDITION |
|---|---|---|
| ● CONDITION 1 | FACIAL DIRECTION | SAME SPEECH CONTENTS AS USER |

LEARNING DATA: HISTORY DATA

● LEARNING DATA EXISTS    ○ NO LEARNING DATA
  ○ NEW LEARNING DATA
  ● HISTORY DATA

BIOLOGICAL SIGNAL : 3

| | BIOLOGICAL SIGNAL TYPE | ACTIVITY | INDEX |
|---|---|---|---|
| ● BIOLOGICAL SIGNAL 1 | PERSPIRATION AMOUNT | SYMPATHETIC NERVE | SUPPRESSION OF ACTIVITY =IMPROVEMENT |
| ○ BIOLOGICAL SIGNAL 2 | - | - | - |

SYMPATHY DEGREE ESTIMATION: AUTONOMIC NERVE ACTIVITY

● SYMPATHY DEGREE ESTIMATION EXISTS    ○ NO SYMPATHY DEGREE ESTIMATION
  ○ BRAIN ACTIVITY
  ● AUTONOMIC NERVE ACTIVITY
  ○ OTHERS

[ DELAY TIME SET ]    [ SAVE ]

INTERACTIVE AGENT FOR IMITATING AND REACTING TO A USER BASED ON USER INPUTS

CROSS-REFERENCE TO RELATED APPLICATION

The present application claims priority from Japanese patent application JP 2017-113177 filed on Jun. 8, 2017, the content of which is hereby incorporated by reference into this application.

BACKGROUND

The invention relates to an interactive system for realizing an interaction with a user through an interactive interface.

Recently, there has been developed an interactive interface for performing a continuous interaction with a human using a robot and CG.

In the development of the interactive interface, there is proposed a technique of calculating interaction feature amounts from interaction data indicating actions during conversation, such as countenance, voice, physical movement, and the like, to control an interactive interface using the interaction feature amounts. According to control of the interactive interface based on the interaction feature amounts, the countenance of a robot or CG varies and the voice is reproduced. This control can induce a human to feel sympathy. As the above mentioned technique, the techniques disclosed in Japanese Unexamined Patent Application Publication Nos. 2012-181697 and 2016-38501.

Japanese Unexamined Patent Application Publication No. 2012-181697 describes as follows: "An interaction state amount calculating unit detects interaction state amounts including pitch, power, or mora during a period of speech at a switching time of speakers, in the speech of a user P. A communication tuning control unit calculates a communication tuning lag amount between the user P and a robot system, minimizes the communication tuning lag amount by continuous pull-in control by a state equation expressing a tuning model, and simultaneously makes the interaction state amount of the user P approach that of the robot system 10 by discrete pull-in control according to an interaction rule, or makes the interaction state amount of the robot system 10 approach that of the user P."

Japanese Unexamined Patent Application Publication No. 2016-38501 describes "a voice interactive system including the steps of inputting speech of a user, extracting prosodic features of the input user's speech, and generating responses to the user's speech, based on the extracted prosodic features, in which when generating the responses, the prosodic features of the responses are adjusted to match with the prosodic features of the user's speech.

SUMMARY

Combination of the techniques disclosed in Japanese Unexamined Patent Application Publication Nos. 2012-181697 and 2016-38501 enables control of an interactive interface for imitating a human's action. Here, a control timing of the interactive interface for imitating a human's action can be set arbitrarily. For example, a control timing of a robot or CG giving responses to a human's speech can be set arbitrarily.

It is necessary to set a control timing according to an action to imitate in order to arouse a human's sympathy. The abovementioned object, however, is not assumed in the above patent publications. The invention in combination of Japanese Unexamined Patent application Publication Nos. 2012-181697 and 2016-38501 is short of variety of actions in the interactive interface, just only to arbitrarily set a control timing of the responses. As the result, effect of arousing a human's sympathy is low.

The invention aims to provide a technique of realizing an interactive interface capable of arousing a human's sympathy strongly.

One typical example of the invention disclosed in this specification is as follows. An interactive system for providing an interactive interface which performs an interaction with a user, has a computer including an arithmetic unit, a storage unit coupled to the arithmetic unit, and an interface coupled to the arithmetic unit, and a measurement device to measure a signal related to speech of the user. The arithmetic unit calculates a first feature amount indicating feature of a user action in the speech of the user, based on the signal measured by the measurement device, calculates a second feature amount that is a control value of a response action to the user performed by the interactive interface, based on the first feature amount, calculates a control time of adjusting a timing of controlling the response action, depending on a type of the response action, and controls the interactive interface, based on the second feature amount and the control time.

According to the invention, by controlling the interactive interface of performing the response action based on a delay time, a user's sympathy can be induced and a continuous interaction having much information can be realized. Other problems, structure, and effects will be apparent from the description of the following embodiments.

BRIEF DESCRIPTION OF THE DRAWINGS

FIG. 3 is a view for use in describing a constitutional example of a computer in the first embodiment;

FIG. 4 is a view showing one example of the data structure of interactive signal information in the first embodiment;

FIG. 5 is a view showing one example of the data structure of imitation information in the first embodiment;

FIG. 6 is a view showing one example of the data structure of delay time defining information in the first embodiment;

FIG. 7 is a view showing one example of the data structure of language signal information in the first embodiment;

FIG. 8 is a view showing one example of the data structure of speech information in the first embodiment;

FIG. 9 is a view showing one example of the data structure of output information in the first embodiment;

FIG. 10 is a view showing one example of the data structure of output condition information in the first embodiment;

FIG. 11 is a view showing one example of the data structure of output history information in the first embodiment;

FIG. 17 is a view showing a flow of delay time learning processing performed by the learning module in the second embodiment;

FIG. 18 is a view showing a constitutional example of a system according to a third embodiment;

FIG. 19 is a view showing one example of the structure of biological signal information held by a computer in the third embodiment;

FIG. 22 is a view showing one example of GUI for performing the setting on a computer in a fifth embodiment.

DETAILED DESCRIPTION

Figure 1:
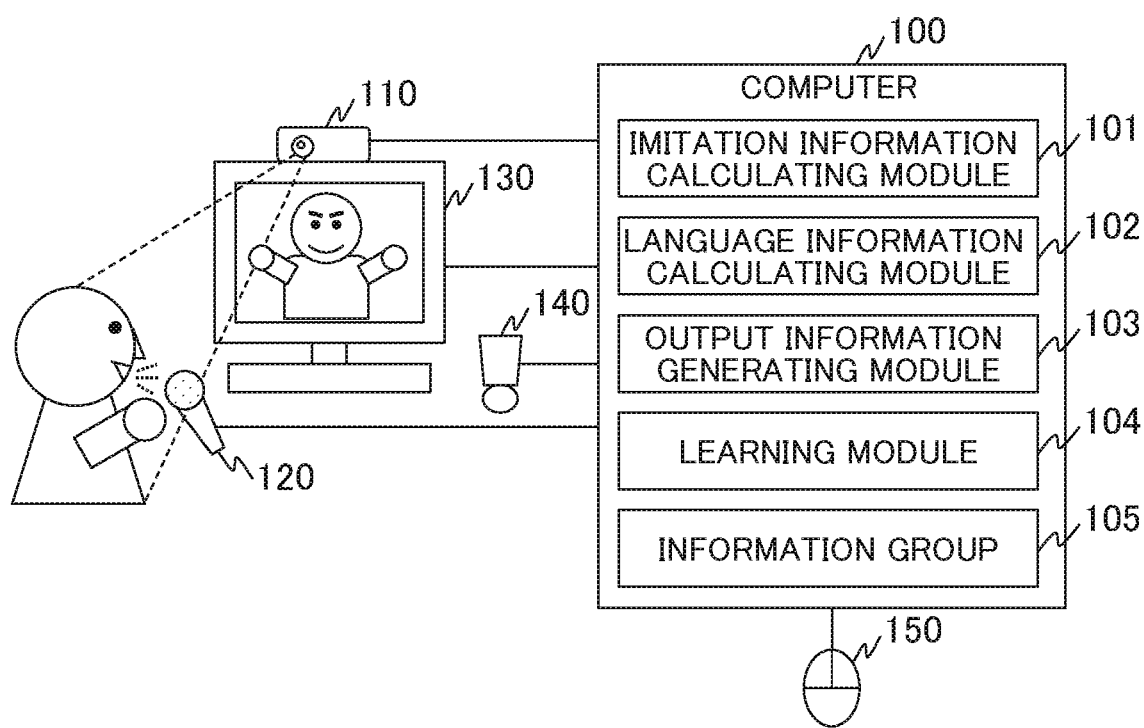
FIG. 1 is a view showing a constitutional example of a system according to a first embodiment.

Hereinafter, embodiments will be described with reference to the drawings. In the structure of the invention described below, the same reference codes are attached to the seine or similar components and functions, and the overlapping description is omitted.

First Embodiment

In this embodiment, a computer which provides an interactive interface for realizing an interaction with a user calculates a control feature amount of a response action to perform, using an interaction signal, and further sets a control time (delay time) for adjusting a timing of controlling the interactive interface corresponding to the response action, depending on the type of the response action. Further, the computer specifies the contents of the user's speech, based on the measured language signal, and selects speech contents to be output in response to the relevant speech contents. The computer generates output information, based on the control feature amount, control time, and speech contents. Here, the terms in the specification will be described.

The interaction signal means a signal obtained from a user in an interaction, particularly a signal including the information about the user's action such as visual line, facial direction, and physical movement. The interaction signal is used for calculating the interaction data. For example, acceleration of a user's image and a part of a user's body is obtained as the interaction signal.

The interaction data is data generated by using the interaction signal for calculating the interaction feature amount.

The interaction feature amount is a value for featuring a user's action. For example, a user's visual direction, facial direction, and body moving direction are calculated as the interaction feature amount.

A language signal is a signal for estimating a language issued by a user or a user's speech. For example, a user's voice is obtained as the language signal.

The response action indicates a movement of a human image displayed on a display forming the interactive interface and a movement of a robot forming the interactive interface.

The control feature amount indicates a control value of the interactive interface for realizing a response action.

In this embodiment, an interactive interface for performing imitation to arouse a user's sympathy will be described as one example. The following processing will be performed in a system for realizing the above interface.

The computer calculates three types of interaction data including a user's eyeballs image, face image, and physical image from the interaction signals including a user's image, and calculates the interaction feature amounts about a user's visual line, facial direction, and physical movement. The computer calculates the control feature amounts of the response actions of imitating the user's visual line, facial direction, and physical movement, based on the interaction feature amounts. The computer sets each control time for each of the three types of the response actions. Further, the computer selects the speech contents to be output to a user, based on the obtained language signal.

The computer generates the output information, based on the control feature amounts, the control time, and the speech contents, performs the response actions, and outputs the speech contents, by controlling the interactive interface, based on the output information.

The interaction data is not restricted to the eyeballs image, face image, and physical image. The interaction data may include various signals during the interaction such as an image of a part of a body such as a hand or an image of the environment, a human voice, a pupil diameter measured with a near-infrared light. The interaction feature amount is not restricted to the user's visual line, facial direction, and physical movement. The interaction feature amount may include various feature amounts which can be extracted from the interaction signal and the language signal such as countenance change extracted from the face image and voice pitch extracted from the voice. The output information may be generated from only the control feature amount or only from the speech contents.

In this embodiment, a user's movement and a user's speech are descried as a user action. Further, the response action and the output of the speech contents (reproduction of voice) are described as an output action. Further, the response action of imitating a user's movement is described as an imitation action, and the control feature amount of the imitation action is described as an imitation feature amount.

FIG. 1 is a view showing a constitutional example of a system according to the first embodiment.

The system includes a computer 100, an interactive signal measurement device 110, a language signal measurement device 120, a display 130, and an interaction output device 140. Further, an input device 150 such as a mouse, a keyboard, and a touch panel is coupled to the computer 100.

The computer 100 generates output information 316 (refer to FIG. 3) using the interaction signal and the language signal and outputs the information from the display 130 and the interaction output device 140 to a user, based on the output information 316. In the embodiment, the display 130 and the interaction output device 140 work as the interactive interface. A human image of performing the imitation action of imitating a user's movement is displayed on the display 130 in the embodiment.

The interactive signal measurement device 110 obtains the interaction signal from a user. The interactive signal measurement device 110 in the embodiment obtains an image as the interaction signal. An angle sensor and an acceleration sensor attached to a user's head portion may be used as the interactive signal measurement device 110. The values measured by the above sensors can be used for calculating a facial direction and a physical movement.

The language signal measurement device 120 obtains the language signal from a user. The language signal measurement device 120 in the embodiment obtains the voice as the language signal.

The input device 150 is a device for inputting an external signal. The external signal indicates a signal for controlling the operation of the computer 100. In this specification, particularly, the signal excluding the interaction signal and the language signal is treated as the external signal.

The outline of the software structure of the computer 100 will be described. The computer 100 includes an imitation information calculating module 101, a language information calculating module 102, an output information generating module 103, and a learning module 104, and further holds an information group 105.

The imitation information calculating module 101 calculates the interaction data from the interaction signal and calculates the interaction feature amount based on the interaction data. The imitation information calculating module 101 calculates the imitation feature amount, based on the interaction feature amount. It is assumed that an algorithm for calculating the imitation feature amount, based on the interaction feature amount, is previously set.

The invention is not restricted to an algorithm for calculating the imitation feature amount. It may be an algorithm for calculating one type of the imitation feature amount based on one type of the interaction feature amount, an algorithm for calculating one type of the imitation feature amount based on a plurality of types of the interaction feature amounts, and an algorithm for calculating a plurality of types of the imitation feature amounts based on one type of the interaction feature amount.

When the input interaction feature amount is a vector amount, in the abovementioned algorithm, an operation of converting a direction of a vector into an opposite direction and an operation of correcting the component value based on the size, shape, and position of a human image are performed. When a user's visual line is directed to an object existing in some coordinates, the imitation feature amount is calculated for reproducing the movement of the eyeballs and a change of the movement so as to adjust the direction of the eyeballs of a human image in the above coordinates.

The language information calculating module 102 estimates the user's speech contents by analyzing the language signal. The language information calculating module 102 selects the speech contents output from the interactive interface, based on the user's speech contents. Here, an algorithm of selecting the speech contents output from the interactive interface is to be set previously.

The invention is not restricted to an algorithm for selecting the speech contents output from the interactive interface.

The output information generating module 103 generates the output information 316, based on the imitation feature amount and the speech contents, and controls the interactive interface based on the output information 316.

The learning module 104 learns the history of the output information 316 (refer to FIG. 3). The processing performed by the learning module 104 will be described in a second embodiment.

In FIG. 1, although one computer 100 has the respective modules, the respective modules may be arranged in a plurality of computers. In FIG. 1, although the measurement device such as the interaction signal measurement device 110 and the computer 100 are described as separate devices, the computer 100 may include the measurement device.

As for the respective modules owned by the computer 100, two or more modules may be integrated into one module or one module may be divided into a plurality of modules in every function.

Figure 2:
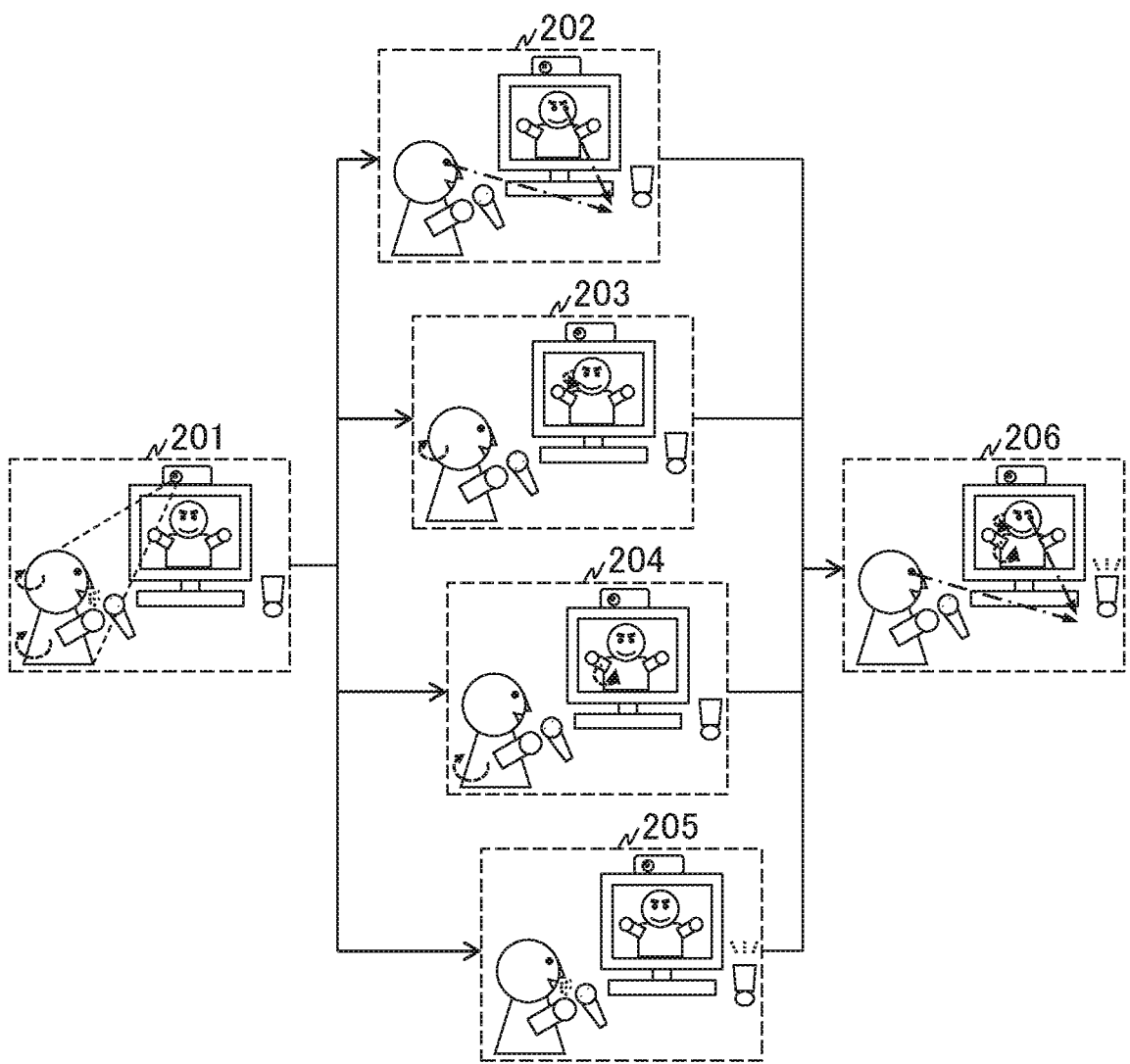
FIG. 2 is a view for use in describing one example of a flow of the operation when performing an interaction using the system according to the first embodiment.

FIG. 2 is a view for use in describing one example of a flow of the operation when performing an interaction using the system according to the first embodiment.

When the computer 100 detects the user action by measuring the interaction signal or the language signal, it calculates the imitation feature amounts of the imitation actions and sets delay times as control times of the respective imitation actions. The interactive interface performs the imitation actions accompanied by the delay times, which arouses a user's sympathy and enables an interaction corresponding to the user's speech contents.

In the input 201, the computer 100 obtains the interaction signal and the language signal from the interactive signal measurement device 110 and the language signal measurement device 120. The computer 100 calculates the interaction data based on the interaction signal, and calculates the interaction feature amount based on the interaction data. The computer 100 estimates the speech contents based on the language signal. The computer 100 performs the operations 202 to 205 in parallel, based on the interaction feature amount and the user's speech contents.

In the operation 202, the computer 100 calculates the imitation feature amount for performing the movement of the eyeballs of a human image imitating the movement of the user's visual line, based on the interaction feature amount about the user's visual line. The computer 100 sets a delay time corresponding to the movement of the eyeballs of the human image.

In the operation 203, the computer 100 calculates the imitation feature amount for performing the movement of a face of the human image imitating the movement of the user's face, based on the interaction feature amount about the movement of the user's face. Further, the computer 100 sets a delay time corresponding to the movement of the face of the human image.

In the operation 204, the computer 100 calculates the imitation feature amount for performing the movement of a body of the human image imitating the movement of the user's body, based on the interaction feature amount about the movement of the user's body. The computer 100 sets a delay time corresponding to the movement of the body of the human image.

In the operation 205, the computer 100 selects the speech contents in accordance with the user's speech contents. Although a delay time is not set for the output of the speech contents in the embodiment, it can be set also for the output of the speech contents.

In the output 206, the computer makes the interactive interface perform the imitation action accompanied by the delay time and output the speech contents.

FIG. 3 is a view for use in describing a constitutional example of the computer 100 according to the first embodiment.

As shown in FIG. 3, the computer 100 includes an arithmetic unit 301, a storage unit 302, an input interface 303, and an output interface 304.

The arithmetic unit 301 is the hardware such as Central Processing Unit (CPU) and Graphics Processing Unit (GPU), executing a program stored in the storage unit 302. The arithmetic unit 301 works as a predetermined module through the operation according to the program. In the embodiment, the arithmetic unit 301 works as the imitation information calculating module 101, the language information calculating module 102, and the output information generating module 103.

The storage unit 302 is the hardware such as a memory, storing the program executed by the arithmetic unit 301 and the information used by this program. The storage unit 302 includes a work area. The program and the information stored in the storage unit 302 will be described later. The computer 100 may include a storage unit such as Hard Disk Drive (HDD) and Solid State Drive (SSD).

The input interface 303 is the hardware of accepting the input of the interaction signal, the language signal, and the external signal. When the above interface is coupled to a device of inputting signals through a connection line of Universal Serial Bus (USB) standard, an interface having a USB terminal becomes the input interface 303, while when it is coupled to a device of inputting signals through a network, an interface having a port becomes the input interface 303.

The output interface 304 is the hardware of outputting various types of information. When the device of outputting the information is a display, an interface having a terminal such as a VGA terminal or an HDMI terminal (HDMI is a registered trademark) becomes the output interface 304, while when the device of outputting the information is a speaker, an interface having the USB terminal becomes the output interface 304.

Here, the program and the information stored in the storage unit 302 will be described.

The storage unit 302 stores the programs for realizing the imitation information calculating module 101, the language information calculating module 102, the output information generating module 103, and the learning module 104. Further, the storage unit 302 stores interaction signal information 311, imitation information 312, delay time defining information 313, language signal information 314, speech information 315, output information 316, output condition information 317, and output history information 318.

The interaction signal information 311 is the information for managing the interaction signals. One example of the data structure of the interaction signal information 311 is described using FIG. 4. The imitation information 312 is the information for managing the imitation feature amounts of the imitation actions. One example of the data structure of the imitation information 312 is described using FIG. 5. The delay time defining information 313 is the information for defining the delay times corresponding to the respective imitation actions. One example of the data structure of the delay time defining information 313 is described using FIG. 6.

The language signal information 314 is the information for managing the language signals. One example of the data structure of the language signal information 314 is described using FIG. 7. The speech information 315 is the information for managing the user's speech contents and the selected speech contents. One example of the data structure of the speech information 315 is described using FIG. 8.

The output information 316 is the information for controlling the interactive interface of performing the imitation actions and outputting the speech contents. One example of the data structure of the output information 316 is described using FIG. 9.

The output condition information 317 is the information for managing the conditions for performing the response actions. One example of the data structure of the output condition information 317 is described using FIG. 10. The processing using the output condition information 317 will be described in a fourth embodiment.

The output history information 318 is the information for managing the history of the output information 316. One example of the data structure of the output history information 318 is described using FIG. 11.

The imitation information calculating module 101 calculates the imitation feature amounts of the respective imitation actions from the interaction signal and sets the delay times corresponding to the respective imitation actions, hence to generate the imitation information 312.

The language information calculating module 102 specifies the user's speech contents from the language signal and selects the speech contents corresponding to the user's speech contents, hence to generate the speech information 315.

The output information generating module 103 generates the output information 316 using the imitation information 312 and the speech information 315.

FIG. 4 is a view showing one example of the data structure of the interaction signal information 311 in the first embodiment.

The interaction signal information 311 includes an entry including ID 401, signal name 402, acquisition time 403, and pointer 404. One entry corresponds to one interaction signal.

The ID 401 is a field for storing the identification information for uniquely identifying the entry of the interaction signal information 311.

The signal name 402 is a field for storing the information for identifying the type of the interaction signal. In the embodiment, the name of the interactive signal measurement device 110 which has measured the interaction signal is stored in the signal name 402. The type of the data included in the signal such as "image" may be stored in the signal name 402.

The acquisition time 403 is a field for storing the acquisition time of the interaction signal. For example, a time with the starting time of measuring the interaction signal as a reference is stored in the acquisition time 403. Here, also a field for storing a value indicating a relationship between the measurement starting time of the interaction signal and that of the language signal may be provided.

The pointer 404 is a field for storing a pointer of the storing region where the obtained interaction signal is stored. Instead of the pointer 404, a field for storing the obtained interaction signal may be provided. For example, a plurality of combinations of the coordinates and RGB values are stored in this field.

FIG. 5 is a view showing one example of the data structure of the imitation information 312 in the first embodiment.

The imitation information 312 includes an entry including ID 501, reference ID 502, imitation feature amount type 503, imitation feature amount 504, delay time 505, interaction data name 506, interaction data 507, interaction feature amount type 508, and interaction feature amount 509. One entry corresponds to the imitation feature amount of one imitation action.

The ID 501 is a field for storing the identification information of uniquely identifying the entry of the imitation information 312. In the embodiment, three types of imitation feature amounts are calculated for one interaction signal.

The reference ID 502 is a field for storing the identification information of the interaction signal used in calculating the imitation feature amounts. The value of the ID 401 is stored in the reference ID 502.

The imitation feature amount type 503 is a field for storing the information indicating the type of the imitation action. One of "eye movement", "facial movement", and "physical movement" is stored in the imitation feature amount type 503 in the embodiment.

The imitation feature amount 504 is a field for storing the calculated imitation feature amount. When the imitation feature amount type 503 is the "visual line", the angle and the moving speed of the eyeballs of a human image are stored in the imitation feature amount 504; when the imitation feature amount type 503 is the "facial movement", the angle and the moving speed of a face of a human image are stored in the imitation feature amount 504; and when the imitation feature amount type 503 is the "physical movement", the moving direction and the moving amount of a body of a human image are stored in the imitation feature amount 504.

The delay time 505 is a field for storing a delay time corresponding to each imitation action.

The interaction data name 506 is a field for storing the identification information of the interaction data used for calculating the interaction feature amount.

The interaction data 507 is a field for storing the interaction data. In the embodiment, the interaction data is an image and a plurality of combinations of the coordinates and the RGB values are included in the interaction data 507. Instead of the interaction data 507, a field for storing a pointer indicating the storing region where the interaction data is stored may be provided.

The interaction feature amount type 508 is a field for storing the identification information of the interaction feature amount. One of the "visual line", "facial direction", and "physical movement" is stored in the interaction feature amount type 508 in the embodiment.

The interaction feature amount 509 is a field for storing the calculated interaction feature amount. When the interaction feature amount type 508 is the "visual line", the coordinates of a target of the user's visual line is stored in the interaction feature amount 509; when the interaction feature amount type 508 is the "facial direction", the inclined angle of a user's face is stored in the interaction feature amount 509; and when the interaction feature amount type 508 is the "physical movement", the moving amount of a user's body is stored in the interaction feature amount 509.

Here, the coordinates of a target of the user's visual line may be the coordinates on the plane surface of a display that is the interaction output device 140, or the coordinates in the three-dimensional space with the interaction output device 140 defined as the original point. The inclined angle of a face is calculated based on a changed distance of the feature points calculated from the apex of nose and the outline of a face or based on a lateral difference thereof. The moving amount of a body per unit time is calculated based on the total sum of the moving distances of the feature points calculated from the outline of a body.

In the embodiment, one type of the imitation feature amount is calculated using one type of the interaction feature amount. Alternatively, one type of the imitation feature amount may be calculated using several types of the interaction feature amounts. In this case, one entry includes a plurality of lines each including one set of the interaction data name 506, the interaction data 507, the interaction feature amount type 508, and the interaction feature amount 509.

FIG. 6 is a view showing one example of the data structure of the delay time defining information 313 in the first embodiment.

The delay time defining information 313 includes an entry including ID 601, imitation feature amount type 602, and delay time 603. One entry corresponds to one type of the imitation action. In the embodiment, three entries are included in the delay time defining information 313 because there are three types of the imitation actions.

The ID 601 is a field for storing the identification information of uniquely identifying the entry in the delay time defining information 313.

The imitation feature amount type 602 is the same as the imitation feature amount type 503.

The delay time 603 is a field for storing a delay time corresponding to each imitation action. The initial delay time is to be set previously by an expert and the like. In the embodiment, a delay time is set with a point of generating the output information 316 defined as a starting point. Here, the invention is not restricted to this setting of the delay time.

The delay time may be set in a combination of the imitation feature amount type and a range of the imitation feature amount. In this case, the entry includes a field for specifying the range of the imitation feature amount.

FIG. 7 is a view showing one example of the data structure of the language signal information 314 in the first embodiment.

The language signal information 314 includes an entry including ID 701, signal name 702, acquisition time 703, and pointer 704. One entry corresponds to one language signal.

The ID 701 is a field for storing the identification information for uniquely identifying the entry of the language signal information 314.

The signal name 702 is a field for storing the information for identifying the type of the language signal. In the embodiment, the name of the language signal measurement device 120 which has measured the language signal is stored in the signal name 702. Here, the type of the data included in the language signal such as the "voice" may be stored in the signal name 702.

There may be provided with a field for storing the value indicating a relationship between the measurement starting time of the interaction signal and that of the language signal and a field for storing the measurement starting time of the interaction signal.

The acquisition time 703 is a field for storing the acquisition time of the language signal. For example, the time with the measurement starting time of the language signal defined as a reference is stored in the acquisition time 703.

The pointer 704 is a field for storing a pointer of the storing region where the obtained language signal is stored. The language signal is stored as A/D converted value. Instead of the pointer 704, a field for storing the obtained language signal may be provided.

FIG. 8 is a view showing one example of the data structure of the speech information 315 in the first embodiment.

The speech information 315 includes an entry including input speech contents 801, reference ID 802, and output speech contents 803. One entry corresponds to the user's speech contents.

The input speech contents 801 is a field for storing the user's speech contents specified by analyzing the language signal.

The reference ID 802 is a field for storing the identification information of the language signal used for specifying the speech contents. The value of the ID 701 is stored in the reference ID 802.

The output speech contents 803 is a field for storing the speech contents selected based on the user's speech contents. For example, the speech contents such as inducing a user to speak or the speech contents such as responding to a user's speech are selected. As a method of selecting the speech contents, a method of using a language database or a method of using a history of the speech contents in the past can be considered.

When setting the delay time in the output of the speech contents, a field for storing the delay time may be provided in the speech information 315.

FIG. 9 is a view showing one example of the data structure of the output information 316 in the first embodiment.

The output information 316 includes an entry including output device 901, output value 902, and delay time 903. One entry corresponds to one output action.

The output device 901 is a field for storing the identification information of a device which performs control corresponding to the output action. In the embodiment, a human image displayed on the display is controlled based on the imitation feature amount and the delay time of the imitation action and a speaker is controlled based on the speech contents.

A value for controlling the interactive interface that performs the output action is stored in the output value 902. When the output action is the imitation action, the type of the imitation feature amount and the imitation feature amount are stored in the output value 902, and when the output action is the output of the speech contents, the speech contents are stored in the output value 902.

FIG. 10 is a view showing one example of the data structure of the output condition information 317 in the first embodiment.

The output condition information 317 includes an entry including ID 1001, act on type 1002, and condition 1003. One entry shows one condition.

The ID 1001 is a field for storing the identification information for uniquely identifying the entry of the output condition information 317.

The action type 1002 is a field for storing the type of the output action. The "speech", "eye movement", "facial movement", and "physical movement" are stored in the action type 1002.

The condition 1003 is a field for storing the condition of defining a timing of executing the output action corresponding to the action type 1002. The condition 1003 includes a value of specifying a concrete condition and a value indicating the delay time and the priority of the condition.

For example, "yes" or "no" in the user's speech contents and in the output speech contents can be set as the condition. Further, start of the speech of a user can be set as the condition. Alternatively, external information such as temperature other than the information relative to the user and the computer 100 may be used to set the condition.

A plurality of conditions can be set for one type of the output action. In this case, the output condition information 317 includes a plurality of entries of the same action type 1002.

It is not always necessary to set the priority. In this case, after elapse of the delay time, when the condition is satisfied, control is to be performed.

FIG. 11 is a view showing one example of the data structure of the output history information 318 in the first embodiment.

The output history information 318 includes an entry including ID 1101, sympathy degree 1102, output value 1103, and delay time 1104. One entry indicates one output information 316.

The ID 1101 is a field for storing the identification information for uniquely identifying the entry of the output history information 318.

The sympathy degree 1102 is a field for storing the sympathy degree indicating the degree of sympathy of a user using the interactive interface. In this embodiment, the sympathy degree is used as the index indicating the effectiveness of the output action which the interactive interface performs. Here, an index other than the sympathy degree may be used.

The sympathy degree can be calculated, for example, using duration of interaction. Here, the duration of interaction indicates a time from the start of the speech of a user or an interactive interface to the end of the speech thereof. It can be determined that the speech starts at a time of reproducing the voice from a speaker or at a time of detecting the language signal, and that the speech ends when a predetermined time has elapsed with no speech. Alternatively, the duration may be measured by pushing down a button informing a user of the start and the end of the speech.

The sympathy degree may be calculated based on the amount of speech by a user and the other information. Further, the sympathy degree may be calculated based on a questionnaire that a user fills in after the end of the interaction.

The output value 1103 and the delay time 1104 are the same as the output value 902 and the delay time 903.

Figure 12:
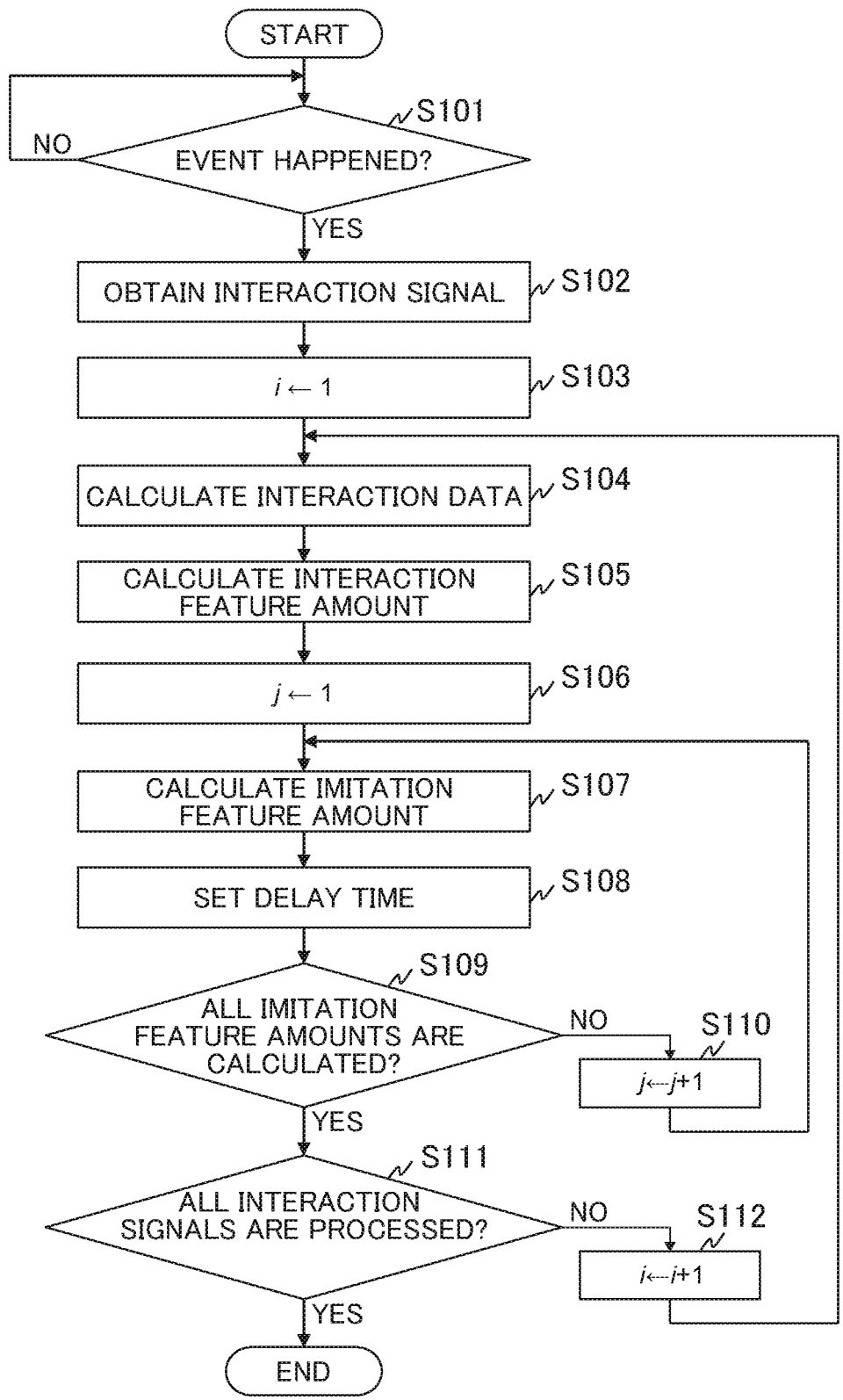
FIG. 12 is a flow chart for use in describing the processing performed by an imitation information calculating module in the first embodiment.

FIG. 12 is a flow chart for use in describing the processing performed by the imitation information calculating module 101 in the first embodiment.

The imitation information calculating module 101 determines whether or not an event has happened (Step S101). For example, when detecting a movement of a user, or when detecting the speech of a user, the above module 101 determines that an event has happened. When a user performs the operation of directing the start of the processing, using the input device 150, the imitation information calculating module 101 determines that an event has happened.

When determining that no event has happened, the imitation information calculating module 101 moves to a waiting state for the next event happening.

When determining that an event has happened, the imitation information calculating module 101 obtains the interaction signal from the interactive signal measurement device 110 (Step S102).

Here, the imitation information calculating module 101 stores the obtained interaction signal into the storing region. The imitation information calculating module 101 initializes the interaction signal information 311 and adds the entries for the number of the obtained interaction signals to the interaction signal information 311. The imitation information calculating module 101 sets a value in each field of the added entries.

The imitation information calculating module 101 may repeat the processing of Step S102 until obtaining all the necessary interaction signals. When a timer is set, the imitation information calculating module 101 may continue to obtain the interaction signals until a time set in the timer elapses.

The imitation information calculating module 101 initializes the variable i (Step S103).

Specifically, the imitation information calculating module 101 sets the variable i at "1". Here, the variable i corresponds to the number of the obtained interaction signals and also to the ID 401 of the interaction signal information 311.

Next, the imitation information calculating module 101 calculates the interaction data, based on the entry in which the ID 401 agrees with the variable i (Step S104).

For example, the imitation information calculating module 101 calculates the image of the eyeballs, image of the whole face, and image of the whole body from one image as the interaction data. Here, the imitation information calculating module 101 stores the interaction data in correspondence with the variable i into the storing region.

The image of the eyeballs and the image of the face may be obtained according to a method of calculating the feature amounts related to the eyeballs and the face from the image, or according to a statistic analysis or machine learning using the feature amounts of the image.

Next, the imitation information calculating module 101 calculates the interaction feature amount (Step S105).

Here, the imitation information calculating module 101 stores the interaction feature amount in correspondence with the type of the interaction feature amount into the storing region.

The imitation information calculating module 101 initializes the variable j (Step S106).

Specifically, the imitation information calculating module 101 sets the variable j at "1". Here, the imitation information calculating module 101 initializes the imitation information 312.

Here, the variable j corresponds to the type of the imitation action. In the embodiment, when the variable j is "1", it indicates the "movement of eyeballs"; when the variable j is "2", it indicates the "facial movement"; and when the variable j is "3", it indicates the "physical movement".

Next, the imitation information calculating module 101 calculates the imitation feature amount of the imitation action corresponding to the variable j, based on the calculated interaction feature amount (Step S107). It is assumed that an expression for calculating the imitation feature amount from the interaction feature amount is given in advance.

Here, the imitation information calculating module 101 adds the entry to the imitation information 312 and sets the identification information in the ID 501 of the added entry. The imitation information calculating module 101 sets the value of the variable i in the reference ID 502 of the added entry, sets the identification information corresponding to the variable j in the imitation feature amount type 503, and sets the calculated imitation feature amount in the imitation feature amount 504. Further, the imitation information calculating module 101 adds as many of the lines as the interaction feature amounts used at a time of calculating the imitation feature amount to the added entry, and sets the identification information and values in the interaction data name 506, the interaction data 507, the interaction feature amount type 508, and the interaction feature amount 509 in each line.

Then, the imitation information calculating module 101 sets the delay time of the imitation action corresponding to the variable j, with reference to the delay time defining information 313 (Step S108).

Specifically, the imitation information calculating module 101 searches for the entry in which the imitation feature amount type 602 agrees with the type corresponding to the variable j, with reference to the delay time defining information 313. The imitation information calculating module 101 obtains the value from the delay time 603 of the searched entry, and sets the obtained value in the delay time 505 of the entry of the imitation information 312 added in Step S107.

The imitation information calculating module 101 determines whether or not all the imitation feature amounts are calculated (Step S109).

When determining that all the imitation feature amounts are not calculated, the imitation information calculating module 101 adds "1" to the variable j (Step S110), and then, the processing is returned to Step S107.

When determining that all the imitation feature amounts are calculated, the imitation information calculating module 101 determines whether or not all the interaction signals are processed (Step S111).

When determining that all the interaction signals are not processed, the imitation information calculating module 101 adds "1" to the variable i (Step S112), and then, the processing is returned to Step S104.

When determining that all the interaction signals are not processed, the imitation information calculating module 101 outputs the imitation information 312 to the output information generating module 103, hence to finish the processing.

Although in the embodiment, the delay time of the imitation action is set based on the delay time defining information 313, the following setting method also may be used. The imitation information calculating module 101 searches the newest history (entry) with reference to the output history information 318. The imitation information calculating module 101 obtains the value of the delay time 1104 of the imitation action corresponding to the variable j from the searched entry and sets the obtained value in the delay time 505.

When a plurality of interaction signals are obtained using a plurality of interactive signal measurement devices 110 or a plurality of measurement channels, the imitation information calculating module 101 can calculate the imitation feature amount using the mean value of the interaction feature amounts calculated from the respective interaction signals.

The interaction signal or the interaction data may be input by a user using the input device 150, other than the value measured by the interactive signal measurement device 110.

Figure 13:
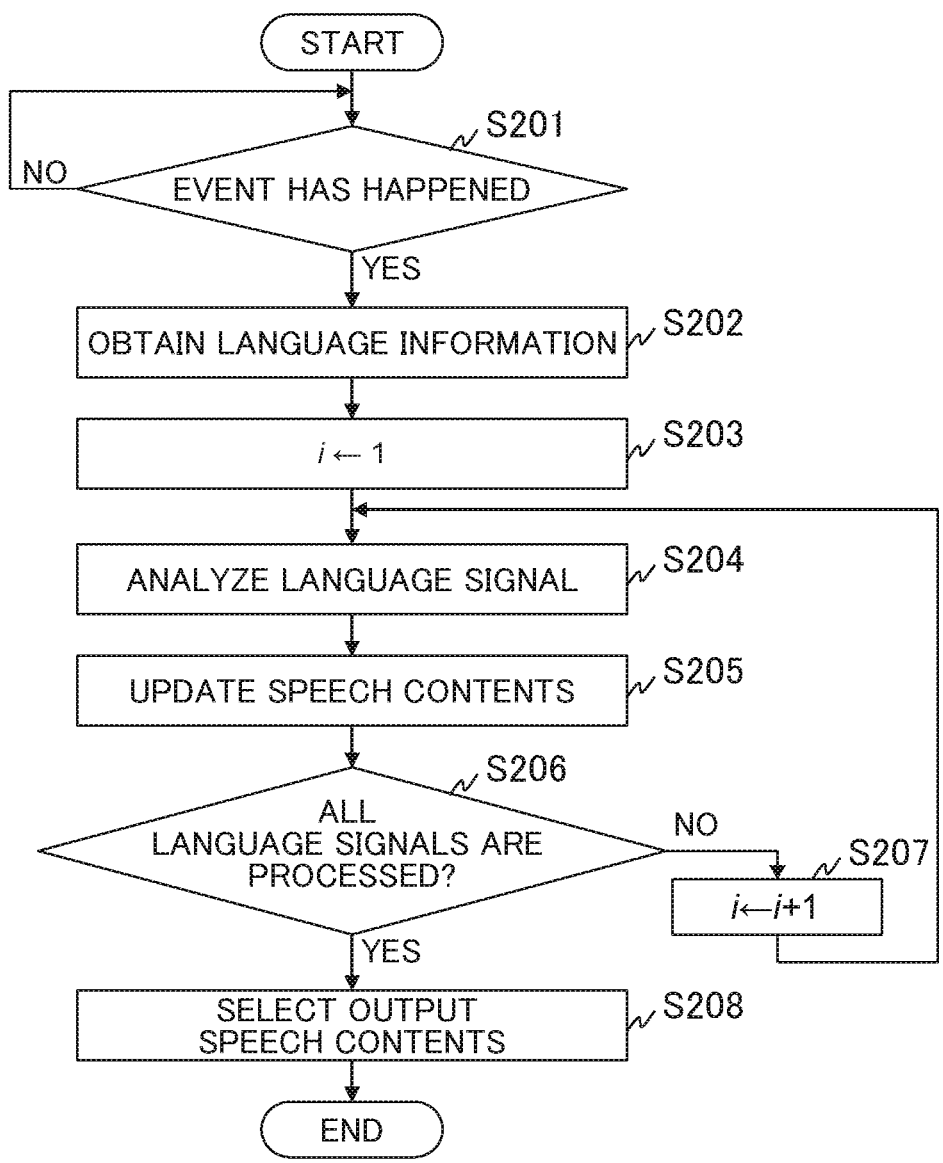
FIG. 13 is a flow chart for use in describing the processing performed by a language information calculating module in the first embodiment.

FIG. 13 is a flow chart for use in describing the processing performed by the language information calculating module 102 in the first embodiment.

The language information calculating module 102 determines whether or not an event has happened (Step S201). The determination method in Step S201 may be the same as the determination method in Step S101 or may be different from that.

When determining that no event has happened, the language information calculating module 102 moves to the waiting state for the event to happen.

When determining that the event has happened, the language information calculating module 102 obtains the language signal from the language signal measurement device 120 (Step S202).

Here, the language information calculating module 102 stores the obtained language signal into the storing region. The language information calculating module 102 initializes the language signal information 314 and adds the entries for the number of the obtained language signals to the language signal information 314. The above module 102 sets a value for each field of the added entries. Further, the module 102 initializes the speech information 315.

The language information calculating module 102 initializes the variable i (Step S203).

Specifically, the language information calculating module 102 sets the variable i at "1". Here, the variable i corresponds to the number of the obtained language signals and further to the ID 701 of the language signal information 314.

Here, the language information calculating module 102 generates the lines for the number of the obtained language signals in the reference ID 802 of the speech information 315.

The language information calculating module 102 analyzes the language signal corresponding to the entry in which the ID 701 agrees with the variable i (Step S204). As the analyzing method of the language signal, the well-known method is used; therefore, the detailed description is omitted.

Next, the language information calculating module 102 updates the speech contents, based on the analytical result (Step S205).

Specifically, the language information calculating module 102 updates the input speech contents 801 in the speech information 315, based on the analytical result, and sets the variable i in the empty column of the reference ID 802.

The language information calculating module 102 determines whether or not all the language signals are processed (Step S206).

When determining that all the language signals are not processed, the language information calculating module 102 adds "1" to the variable i (Step S207), and then, the processing is returned to Step S204.

When determining that ail the language signals are processed, the language information calculating module 102 selects the output speech contents, based on the input speech contents, and sets the above in the output speech contents 803 in the speech information 315 (Step S208). Then, the language information calculating module 102 outputs the speech information 315 to the output information generating module 103, hence to finish the processing. The well-known method can be used as the selecting method of the output speech contents; therefore, the detailed description is omitted.

Although in the embodiment, only the user's speech contents are specified, speed and rhythm of the speech may be calculated as the language feature amounts. The speed and rhythm of the speech contents of the interactive interface can be controlled by using the language feature amounts.

Figure 14:
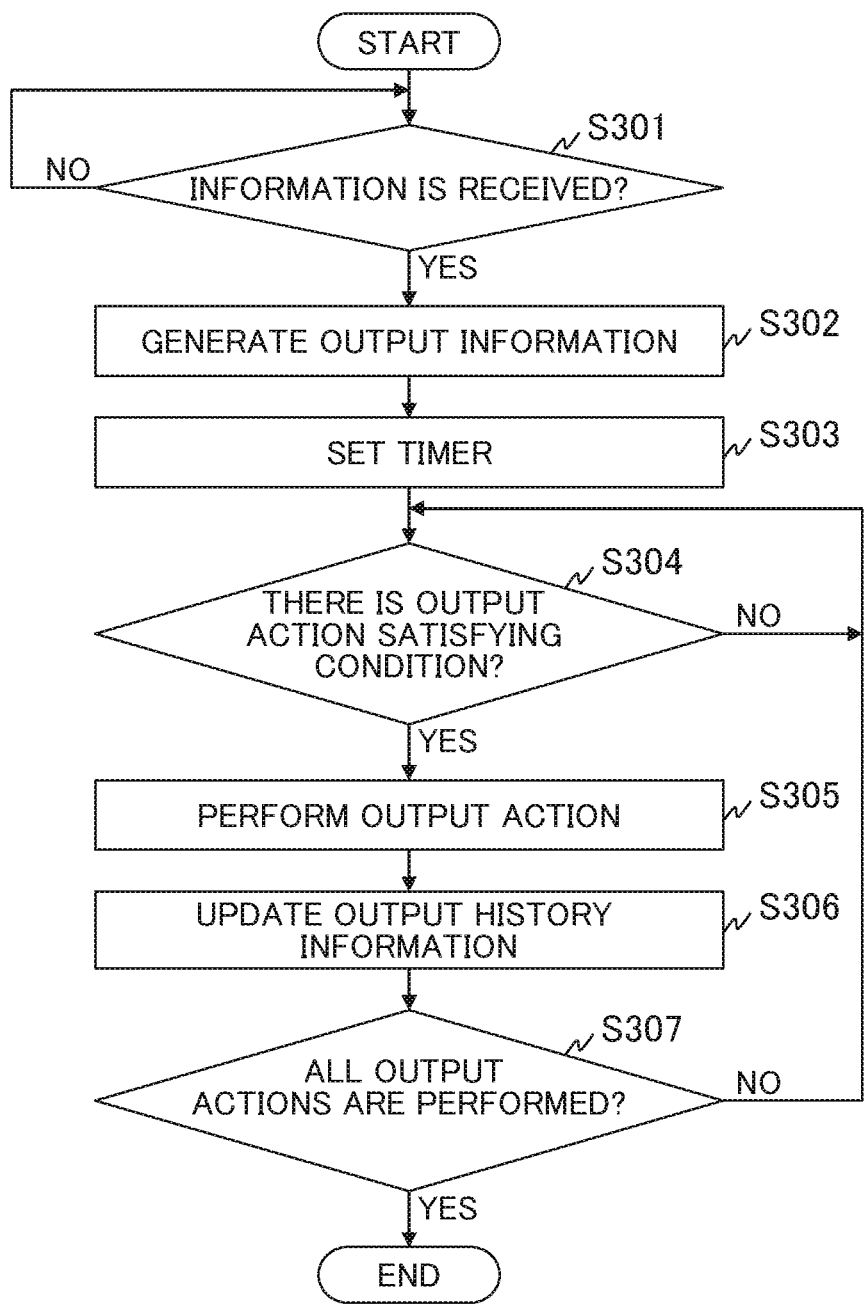
FIG. 14 is a flow chart for use in describing the processing performed by an output information generating module in the first embodiment.

FIG. 14 is a flow chart for use in describing the processing performed by the output information generating module 103 in the first embodiment.

The output information generating module 103 determines whether or not the information has been received (Step S301).

Specifically, the output information generating module 103 determines whether or not at least one of the imitation information 312 and the speech information 315 has been received. Since the generation timing of the imitation information 312 does not always agree with that of the speech information 315, the output information generating module 103 may accept the input of the information for a predetermined period of time after receipt of some information.

When determining that any information has not been received, the output information generating module 103 keeps waiting for the input of the information.

When determining that some information has been received, the output information generating module 103 generates the output information 316 (Step S302). Specifically, the following processing is performed.

Upon receipt of the imitation information 312, the output information generating module 103 reads one entry from the imitation information 312. The output information generating module 103 adds the entry to the output information 316, and sets "display" in the output device 901 of the added entry. The output information generating module 103 sets the values of the imitation feature amount type 503 and the imitation feature amount 504 of the selected entry in the output value 902 of the added entry. Further, the output information generating module 103 sets the value of the delay time 505 of the selected entry in the delay time 903 of the added entry. The output information generating module 103 performs the same processing on the respective entries of the imitation information 312.

In case of receiving the speech information 315, the output information generating module 103 reads one entry from the speech information 315. The output information generating module 103 adds the entry to the output information 316, and sets the "speaker" in the output device 901 of the added entry. The output information generating module 103 sets the value of the output speech contents 803 of the selected entry in the output value 902 of the added entry. The output information generating module 103 sets "0" in the delay time 903 of the added entry. The above is the description of the processing in Step S302.

Next, the output information generating module 103 sets a timer (Step S303).

Next, the output information generating module 103 determines whether or not there is the output action satisfying the condition (Step S304).

Specifically, the output information generating module 103 searches for the entry in which the delay time 903 is the value of the timer and more, from the output information 316. When there is the entry in which the delay time 903 is the value of the timer and more, the output information generating module 103 determines that there is the output action satisfying the condition.

When determining that there is not any output action satisfying the condition, the output information generating module 103 returns the processing to Step S304, where the timer is continuously updated.

When determining that there is the output action satisfying the condition, the output information generating module 103 performs the output action corresponding to the entry searched in Step S304 (Step S305).

Specifically, the output information generating module 103 controls the interactive interface, based on the output value 902 of the searched entry. According to this control, the interactive interface outputs the speech contents and performs the response action.

Next, the output information generating module 103 updates the output history information 318 (Step S306). Specifically, the following processing is performed.

The output information generating module 103 adds the entry to the output history information 318, and sets the identification information to the ID 1101 of the added entry.

The output information generating module 103 generates the same number of the lines as the number of the entries searched in Step S304, in the added entry. The output information generating module 103 sets the values of the output value 902 and the delay time 903 of the searched entry in Step S304, in the output value 1103 and the delay time 1104 of each of the generated lines. In the first embodiment, after finishing the control of the interactive interface based on the output information 316, the sympathy degree calculated based on the duration of the interaction, the speech amount of a user, or the questionnaire is set in the sympathy degree 1102.

The output information generating module 103 deletes the entry selected in Step S304 from the output information 316. The above is the description of the processing of Step S306.

The output information generating module 103 determines whether or not all the output actions are performed (Step S307).

Specifically, the output information generating module 103 determines whether or not the output information 316 is empty. When the output information 316 is empty, the output information generating module 103 determines that all the output actions are performed.

When determining that all the output actions are not performed, the output information generating module 103 returns the processing to Step S304, where the same processing is performed.

When determining that all the output actions are performed, the output information generating module 103 finishes the processing.

According to the first embodiment, by controlling the interactive interface of performing the output action based on the delay time, it is possible to arouse a user's sympathy and realize a continuous interaction having much information.

Second Embodiment

In a second embodiment, the computer 100 updates the delay time defining information 313, based on the analytical result of the output history information 318, and further updates the speech contents or the selected algorithm of the speech contents. The second embodiment will be described mainly about a difference from the first embodiment.

The system structure of the second embodiment is the same as that of the first embodiment. The structure of the computer 100 in the second embodiment is the same as that of the computer 100 in the first embodiment. The information held by the computer 100 in the second embodiment is different from that in the first embodiment in the delay time defining information 313. The other information is the same as the information held by the computer 100 in the first embodiment.

Figures 15, 16:
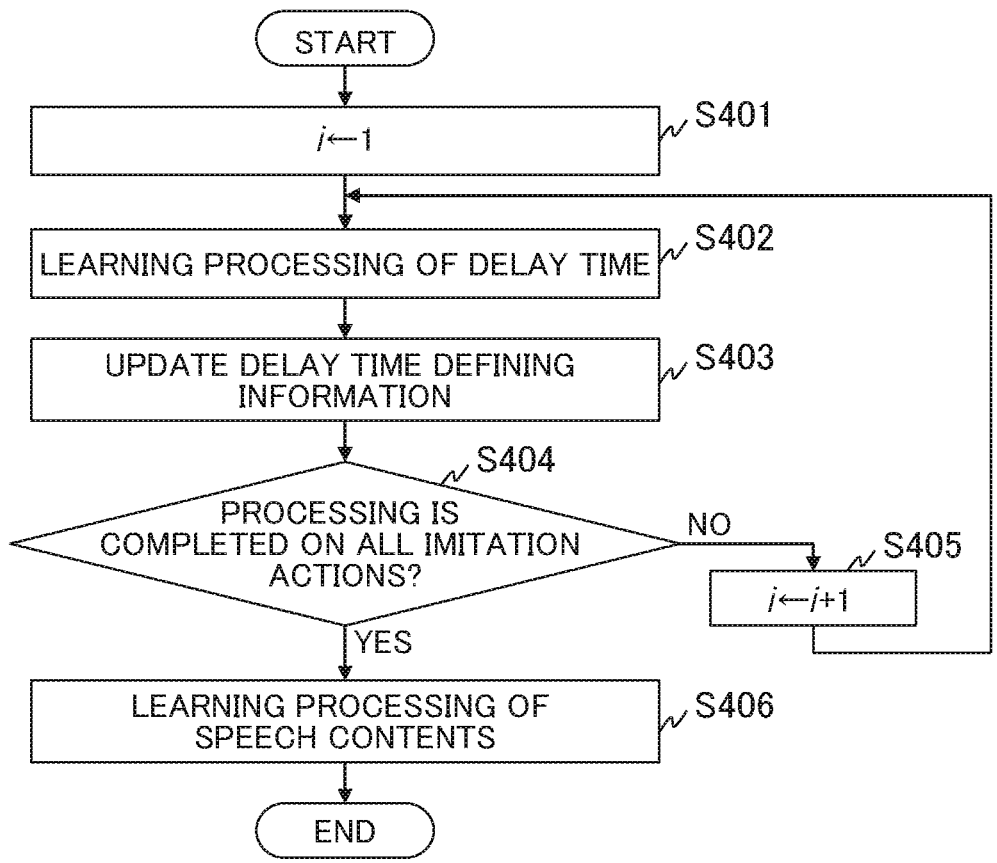
FIG. 15 is a view showing one example of the data structure of delay time defining information in a second embodiment.
FIG. 16 is a flow chart for use in describing the processing performed by a learning module in the second embodiment.

FIG. 15 is a view showing one example of the data structure of the delay time defining information 313 in the second embodiment.

The delay time defining information 313 includes an entry including ID 1501, imitation feature amount type 1502, and delay time range 1503. One entry corresponds to one type of the imitation action.

The fields of the ID 1501 and the imitation feature amount type 1502 are the same as those of the ID 601 and the imitation feature amount type 602.

The delay time range 1503 is a field for storing the range of the delay time corresponding to the imitation action. The delay time range 1503 is a field including the minimum value and the maximum value.

When the delay time is always constant, a user previously perceives the performance of the imitation action which may deteriorate the sympathy degree. In the second embodiment, the computer 100 sets the delay time within a predetermined range at random. This can avoid the previous perception of the performance of the imitation action.

The range of the delay time which enhances the sympathy degree varies depending on the elapse of time and the changing situation. The computer 100 in the second embodiment analyzes the history of the output information 316 and then updates the range of the delay time.

FIG. 16 is a flow chart for use in describing the processing performed by the learning module 104 in the second embodiment. FIG. 17 is a view showing a flow of learning processing of the delay time performed by the learning module 104 in the second embodiment.

After the output information 316 is output or when an instruction is received from a user, the learning module 104 performs the processing described later. The learning module 104 may perform the processing periodically.

The learning module 104 initializes the variable i (Step S401).

Specifically, the learning module 104 sets the variable i at "1". Here, the variable i corresponds to the type of the imitation action. In the embodiment, when the variable i is "1", it indicates the "movement of eyeballs"; when the variable i is "2", it indicates the "facial movement"; and when the variable i is "3", it indicates the "physical movement".

Next, the learning module 104 performs the learning processing of the delay time of the imitation action corresponding to the variable i (Step S402). Specifically, the following processing is performed.

(First Step) The learning module 104 reads a predetermined number of entries from the output history information 318. Here, the predetermined number of the entries are read out in the descending order of time, or in the decreasing order of the ID 1101. The number of the read entries is previously set and can be properly changed.

(Second Step) The learning module 104 selects one entry of the read entries and searches for the line having the identification information of the imitation action corresponding to the variable i set in the output value 1103, from among the lines included in the selected entry. The learning module 104 plots the sympathy degree 1102 of the selected entry and the delay time 1104 of the searched line, in a space with the sympathy degree and the delay time as an axis.

When there are a plurality of lines each having the identification information of the imitation action corresponding to the variable i, the learning module 104 plots the statistic values of the delay time 1104 and the sympathy degree 1102 in each line, in the above mentioned space. The statistic value may include the maximum value, the minimum value, and the mean value.

The learning module 104 performs the processing of the (Second Step) on all the read entries. According to this, a graph 1701 is generated.

(Third Step) The learning module 104 calculates the optimum delay time based on the processing result of the (Second Step). As the calculation method, the following method can be considered.

(Method 1) The learning module 104 calculates the delay time having the maximum sympathy degree as the optimum delay time, from the graph 1701.

(Method 2) The learning module 104 sets a relational expression including an undetermined coefficient with the sympathy degree fixed as y and the delay time fixed as x, to determine a coefficient based on the least square method. The learning module 104 calculates the x having the maximum y using the above relational expression. The relational expression is set as, for example, $y=ax^2+bx+c$. When the delay time having the maximum sympathy degree is equal to the maximum value or the minimum value of all the delay times, the relational expression may be set as $y=ax+b$, to calculate the x having the maximum y in a predetermined range.

(Fourth Step) The learning module 104 calculates a delay time range using the optimum delay time. For example, the learning module 104 calculates the value obtained by multiplexing the optimum delay time by 0.95 as the minimum value and calculates the value obtained by multiplexing the optimum delay time by 1.05 as the maximum value. As another method, the learning module 104 calculates the range where the sympathy degree is more than the threshold, based on the graph 1701.

The above mentioned processing is only one example and not restricted to this. For example, a multivariate analysis such as a main component analysis using the imitation feature amount included in the entry may be performed.

The learning processing in the second embodiment can be adopted to the first embodiment. In this case, the (First Step), (Second Step), and (Third Step) are performed. The learning module 104 sets the optimum delay time in the delay time 603. The above is the description of the processing in Step S402.

The learning module 104 updates the delay time defining information 313 based on the result of the learning processing (Step S403).

Specifically, the learning module 104 sets the calculated maximum value and minimum value in the delay time range 1503 of the entry of the imitation action corresponding to the variable i.

The learning module 104 determines whether or not the processing has been completed on all the imitation actions (Step S404).

When determining that the processing is not completed on all the imitation actions, the learning module 104 adds "1" to the variable i (Step S405), and then, the processing is returned to Step S402.

When determining that the processing has been completed on all the imitation actions, the learning module 104 performs the learning processing of the speech contents (Step S406).

Specifically, the following processing is performed.

(First Step) The learning module 104 reads a predetermined number of entries from the output history information 318. Here, the predetermined number of the entries are read in the descending order of time, or in the decreasing order of the ID 1101. The number of the read entries is previously set and can be properly changed.

(Second Step) The learning module 104 searches for the line where the speech contents are set in the output value 1103, from among the lines included in each of the read entries. The learning module 104 obtains the sympathy degree 1102 and the speech contents of the searched line.

Here, the learning module 104 may obtain the speech contents set in the searched line as they are, or the speech contents for a predetermined number of characters, or the speech contents including a specified term. When obtaining the speech contents set in the searched line as they are, the learning module 104 may divide the speech contents into every phrase and may deal the above as the data in correspondence with the phrase and the sympathy degree.

(Third Step) The learning module 104 calculates a relationship between the sympathy degree and the speech contents. The learning module 104 stores the speech contents having the higher sympathy degree into a language database. Here, only the phrase including a specified term or expression may be stored in the language database. The learning module 104 may modify the algorithm based on the above-mentioned relationship. The above is the description of the processing in Step S406.

In the second embodiment, the processing performed by the imitation information calculating module 101 is partially different. Specifically, in Step S108, the imitation information calculating module 101 determines the delay time within the range shown in the delay time range 1503 at random. The imitation information calculating module 101 sets the determined delay time in the delay time 505 of the entry of the added imitation information 312. The other processing is the same as the processing in the first embodiment.

In the second embodiment, the processing performed by the language information calculating module 102 is partially different. Specifically, in Step S208, the language information calculating module 102 selects the speech contents stored in the updated language database. When there are a plurality of the corresponding speech contents, the above module 102 may select the speech contents based on similarity. The other processing is the same as the processing in the first embodiment.

The processing performed by the output information generating module 103 in the second embodiment is the same as the processing in the first embodiment.

The history of the output information 316 may be managed in every user unit. In this case, a field for storing the identification information of a user may be provided in the output history information 318. According to this, the learning processing using only the output information 316 related to a target user and the learning processing using the output information 316 related to the users other than the target user can be performed. Through the learning processing, the delay time of the imitation action can be set in every user unit.

According to the second embodiment, it is possible to realize an interaction that can arouse a user's much more sympathy by updating the delay time range or the delay time through the learning processing. Further, by selecting the delay time at random from the delay time width, performance of the natural and variable output actions are enabled, hence to realize an interaction more sympathetic and continuous, and including much more information.

Third Embodiment

In a third embodiment, the computer 100 obtains a biological signal for calculating the sympathy degree and calculates the sympathy degree at real time. In the third embodiment, the computer 100 calculates the delay time based on the sympathy degree. The third embodiment will be described mainly about a difference from the first embodiment.

FIG. 18 is a view showing the constitutional example of a system according to the third embodiment.

The system according to the third embodiment includes a measurement device of obtaining a biological signal. Specifically, the system in the third embodiment includes an electroencephalograph 1801, a heartbeat measuring device 1802, and a perspiration amount measuring device 1803.

The electroencephalograph 1801 measures the biological signal such as brain waves and blood flow in brain. The heartbeat measuring device 1802 measures the biological signal indicating heartbeat. The perspiration amount measuring device 1803 measures the biological signal indicating perspiration amount. The heartbeat measuring device 1802 and the perspiration amount measuring device 1803 are only one example of a device of measuring the index used for estimating the autonomic nerve activity and it is not restricted to these.

An information group 105 in the third embodiment includes biological signal information 1900. FIG. 19 is a view showing one example of the data structure of the biological signal information 1900 held by the computer 100 in the third embodiment. The biological signal information 1900 includes an entry including ID 1901, signal name 1902, acquisition time 1903, and pointer 1904. One entry corresponds to one biological signal.

The ID 1901 is a field for storing the identification information for uniquely identifying the entry of the biological signal information 1900.

The signal name 1902 is a field for storing the information for identifying the type of the biological signal. In the embodiment, the name of the measuring device which measures the biological signal is stored in the signal name 1902. Alternatively, the type of the data included in the biological signal may be stored there.

The acquisition time 1903 is a field for storing an acquisition time of the biological signal. The acquisition time 1903 stores, for example, a time with the starting time to measure the biological signal as a reference.

The pointer 1904 is a field for storing the pointer of the storing region where the obtained biological signal is stored. Instead of the pointer 1904, a field for storing the obtained biological signal may be provided.

Figures 20, 21A:
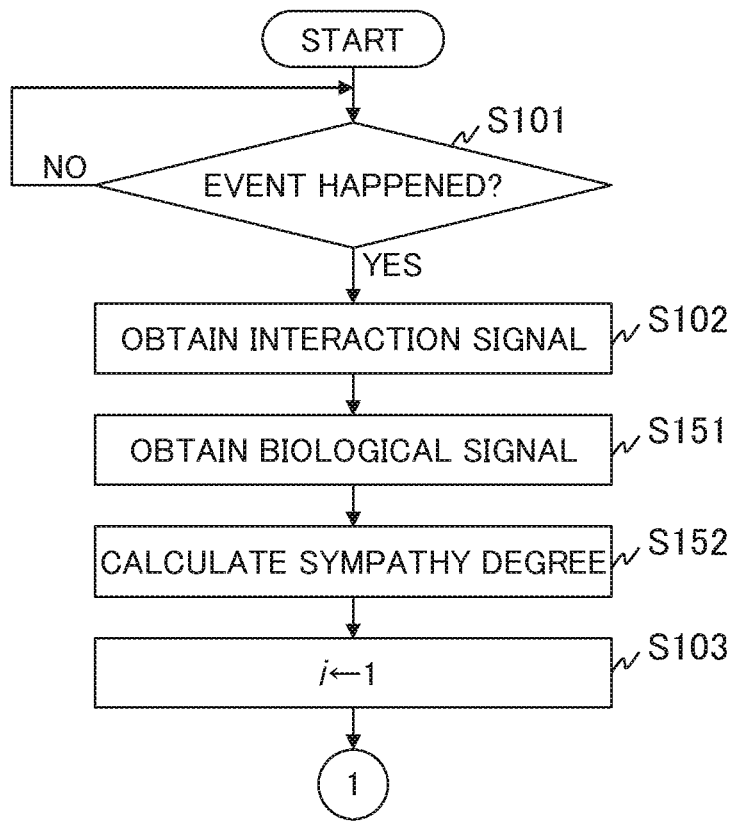
FIG. 20 is a view showing one example of the data structure of output information in the third embodiment.
FIG. 21A is a flow chart for use in describing the processing performed by an imitation information calculating module in the third embodiment.

In the third embodiment, of the information included in the information group 105, the output information 316 is partially different. FIG. 20 is a view showing one example of the data structure of the output information 316 in the third embodiment.

The entry included in the output information 316 of the third embodiment includes the sympathy degree 2001. The sympathy degree 2001 is a field for storing the sympathy degree calculated using the biological signals.

Figure 21B:
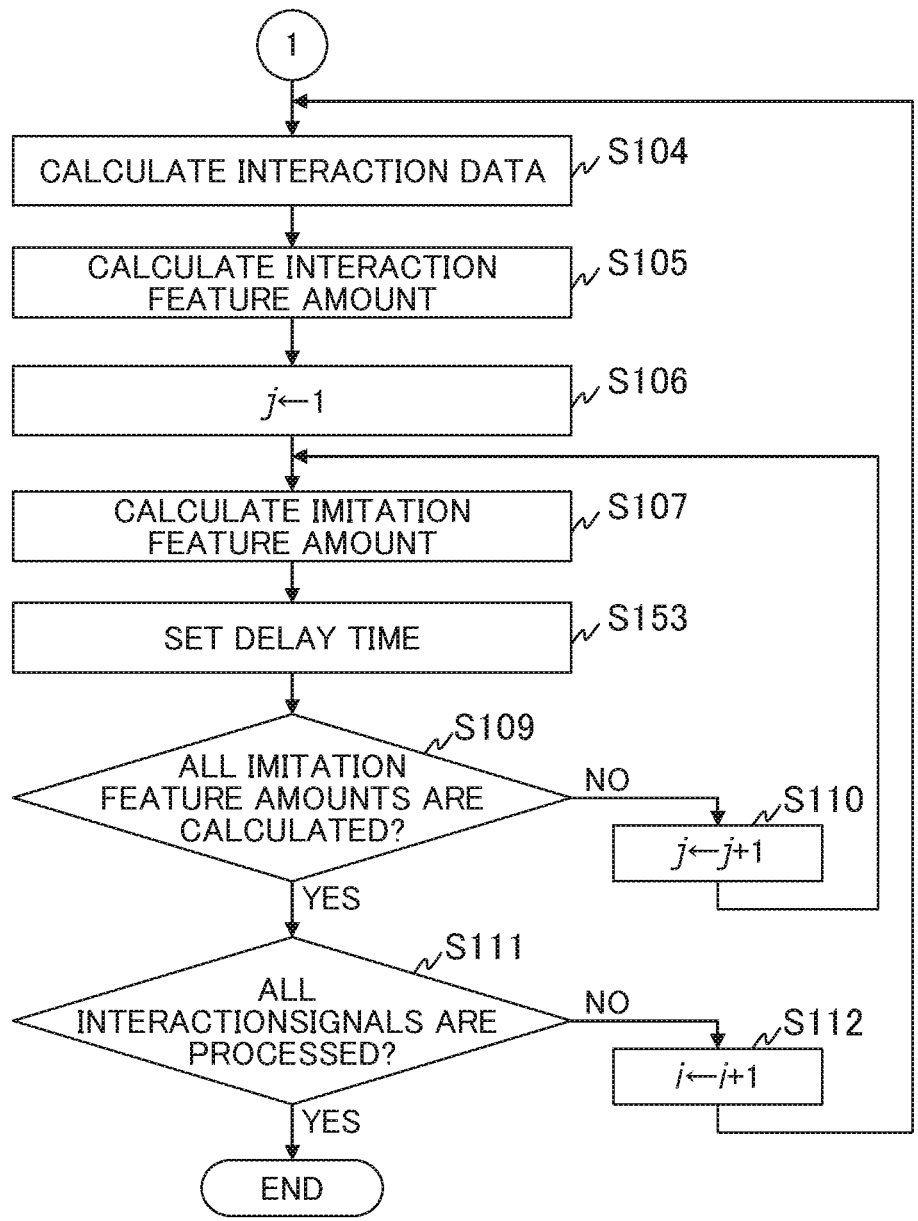
FIG. 21B is a flow chart for use in describing the processing performed by the imitation information calculating module in the third embodiment.

The processing performed by the imitation information calculating module 101 is partially different in the third embodiment. FIGS. 21A and 21B are flow charts for use in describing the processing performed by the imitation information calculating module 101 in the third embodiment.

When determining that an event has happened, the imitation information calculating module 101 obtains the biological signals as well as the interaction signals (Step S151).

The imitation information calculating module 101 stores the obtained biological signals in the storing region. The imitation information calculating module 101 initializes the biological signal information 1900 and adds as many of the entries as the obtained biological signals to the biological signal information 1900. The imitation information calculating module 101 sets a value in each field of the added entries.

Next, the imitation information calculating module 101 calculates the sympathy degree using the biological signals (Step S152).

For example, when obtaining the biological signal indicating the perspiration amount from the perspiration amount measuring device 1803, the imitation information calculating module 101 calculates the perspiration amount per unit time. When the perspiration amount is large, it indicates that, of the autonomic nerve activity, the sympathetic nerve activity is enhanced; while when the perspiration amount is small, it indicates that the sympathetic nerve activity is suppressed. The imitation information calculating module 101 calculates the sympathy degree, based on the expression with the perspiration amount as a variable. When the sympathetic nerve activity is suppressed, a user is in a state of relaxation and the sympathy degree becomes greater.

When obtaining several types of the biological signals, the imitation information calculating module 101 calculates each index for calculating the sympathy degree from each of the biological signals of different types and calculates the sympathy degree based on the expression with the above index as the variable. Here, the index may be a value standardized by using the biological signal at rest. For example, in the case of obtaining the biological signals indicating the heartbeat interval and the perspiration amount, the module 101 calculates each index, each change rate from the reference value, and further the mean value of the change rates as the sympathy degree. Here, it is considered that the mean value of the biological signals per unit time calculated by using the biological signals obtained at rest is used as the reference value.

When there are plural measurement devices of obtaining the biological signals of the same type, the mean value of the indexes calculated from the respective types of the biological signals may be used.

After performing the processing in Step S107, the imitation information calculating module 101 sets the delay time (Step S153). Specifically, the following processing is performed.

The imitation information calculating module 101 searches for the entry in which the imitation feature amount type 602 agrees with the type corresponding to the variable j, with reference to the delay time defining information 313. The imitation information calculating module 101 obtains the value from the delay time 603 of the searched entry.

The imitation information calculating module 101 calculates the delay time to set, using the expression with the sympathy degree and the delay time as the variable.

The imitation information calculating module 101 sets the calculated delay time in the delay time 505 of the entry of the imitation information 312 added in Step S107. Further, the imitation information calculating module 101 sets the calculated delay time in the delay time 603 of the entry searched from the delay time defining information 313.

With reference to the output history information 318, the imitation information calculating module 101 may search for the entry having the largest sympathy degree, of the entries in which the value of the sympathy degree 1102 is larger than the calculated sympathy degree and may set the value of the delay time 1104 of the searched entry as the delay time 505.

The interaction signal may be used for calculating the sympathy degree. In this case, the processing in Step S152 is performed after the processing in Step S107. The above is the description of the processing in Step S153.

The imitation information calculating module 101 may obtain the biological signals and the interaction signals for a predetermined period and then, instruct the learning module 104 to perform the learning processing. In this case, the learning processing is performed at short interval of time. The imitation information calculating module 101 sets the optimum delay time calculated by the learning module 104.

The processing from Step S101 to Step S107 and the processing from Step S109 to Step S112 are the same as the processing described in the first embodiment.

Although the sympathy degree is calculated by using the biological signals in the embodiment, the sympathy degree may be calculated by using the interaction signals. For example, the imitation information calculating module 101 can analyze the face image, calculate the feature amounts of a user's eyebrows, eyes, and mouth, and estimate the user's expression from the above feature amounts, hence to calculate the similar index.

The processing performed by the language information calculating module 102 is the same as the processing in the first embodiment. The processing performed by the output information generating module 103 is partially different from the processing in Step S302 and the processing in Step S306. The processing in the other steps is the same as the processing in the first embodiment.

In Step S302, after adding the entry to the output information 316, the output information generating module 103 sets the sympathy degree calculated in Step S152 in the sympathy degree 2001 of the added entry. The other processing is the same as that in the first embodiment.

In Step S306, the output information generating module 103 sets the sympathy degree calculated in Step S152 in the sympathy degree 1102 of the entry added in the output history information 318. The other processing is the same as that in the first embodiment.

According to the third embodiment, by setting the delay time based on the sympathy degree calculated at real time, it is possible to realize an interaction that can arouse higher sympathy.

Fourth Embodiment

In a fourth embodiment, the computer 100 uses the delay time and the output condition information 317 as the information of controlling the interactive interface performing the output actions. The fourth embodiment will be described mainly about a difference from the first embodiment.

The system structure in the fourth embodiment is the same as that in the first embodiment. The structure of the computer 100 in the fourth embodiment is the same as that of the computer 100 in the first embodiment. The information held by the computer 100 in the fourth embodiment is the same as that of the computer 100 in the first embodiment.

The processing performed by the imitation information calculating module 101 and the language information calculating module 102 in the fourth embodiment is the same as the processing in the first embodiment.

In the fourth embodiment, the processing performed by the output information generating module 103 is partially different. Specifically, the processing in Steps S304 and S305 is different.

The output information generating module 103 searches for the entry in which the delay time 903 is the value of the timer and more, from the output information 316. Further, with reference to the output condition information 317, the output information generating module 103 searches for the entry corresponding to the current state from the condition 1003, based on the imitation feature amount and the speech contents.

When there is the entry corresponding to at least one of the above two searching operations, the output information generating module 103 determines that there is the output action satisfying the condition.

In Step S305, the output information generating module 103 adjusts the control timing of the interactive interface, based on the delay time 903 and the condition 1003 obtained through the two searching operations. When the respective entries are found through the two searching operations, the interactive interface is controlled based on the priority.

According to the fourth embodiment, the computer 100 controls the performance of the output action based on the delay time and the output condition, which enables various output actions. As the result, it is possible to realize an interaction that can arouse a user's sympathy and therefore an interaction continuous and having much more information.

Fifth Embodiment

In a fifth embodiment, Graphical User Interface (GUI) for performing the setting on the computer 100 will be described.

Figure 23:
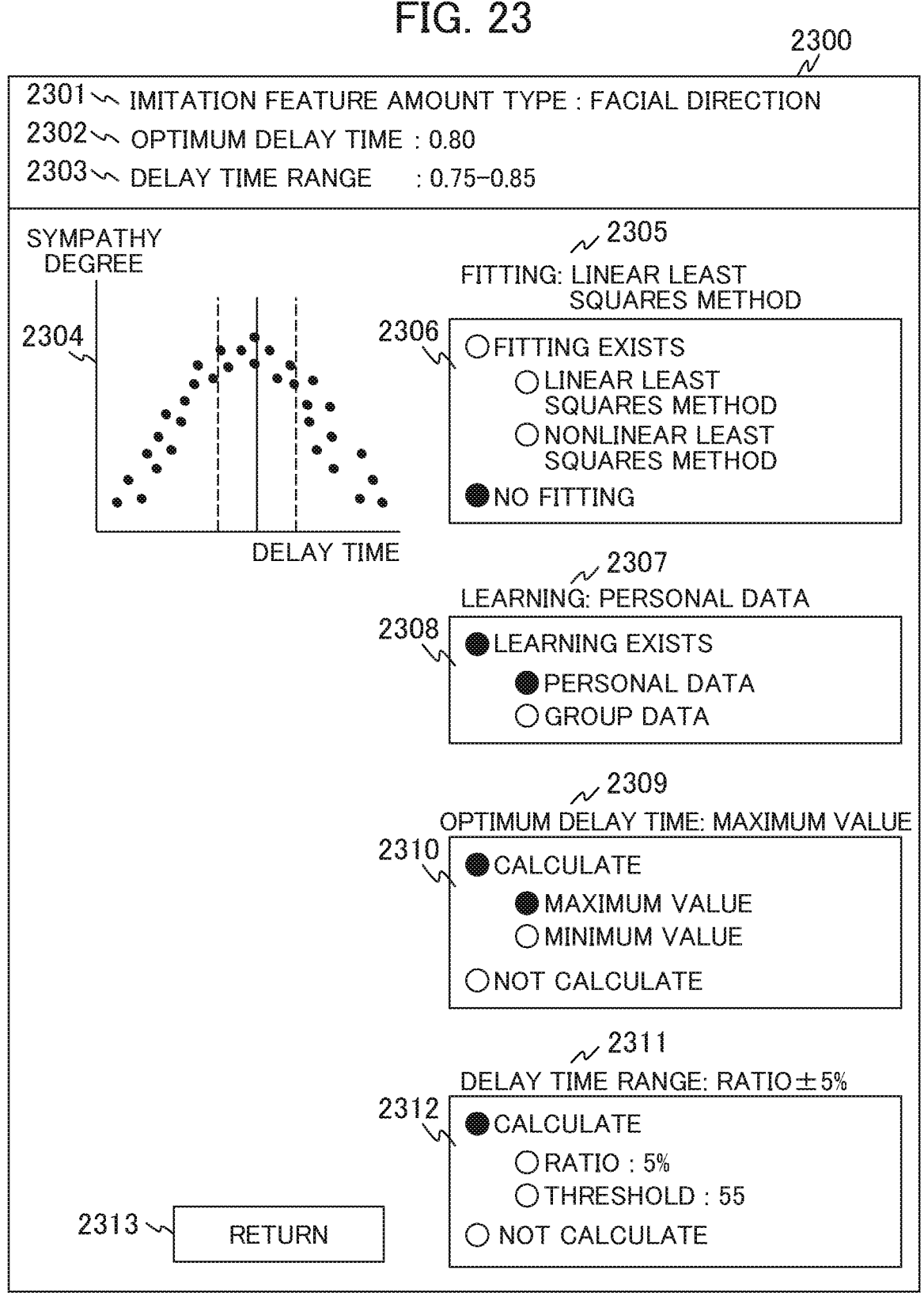
FIG. 23 is a view showing one example of the GUI for performing the setting on the computer in the fifth embodiment.

FIGS. 22 and 23 are views showing one example of the GUI for performing the setting on the computer 100 in the fifth embodiment.

The GUI 2200 shown in FIG. 22 is a GUI for performing the setting on the information, including an interaction feature amount setting column 2210, an imitation feature amount setting column 2220, a condition setting column 2230, a learning processing setting column 2240, a biological signal setting column 2250, a sympathy degree estimation setting column 2260, a delay time setting button 2270, and a save button 2275.

The interaction feature amount setting column 2210 is a column for setting the interaction feature amount, including a set number display column 2211, a radio button 2212, and a setting field group 2213. By inputting a value in the interaction feature amount setting column 2210, the interaction data and the interaction feature amount to calculate can be set in the computer 100.

The set number display column 2211 is a column for displaying the number of the types of the set interaction feature amounts.

The radio button 2212 is a button operated for setting the interaction feature amount. By operating the radio button 2212, input into the setting field group 2213 is enabled.

The setting field group 2213 includes a field for setting the type of the interaction signal, the type of the interaction data, and the type of the interaction feature amount. The setting field group 2213 may include another field.

The imitation feature amount setting column 2220 is a column for setting the imitation feature amount, including the set number display column 2221, the radio button 2222, and the setting field group 2223. By inputting a value in the imitation feature amount setting column 2220, the imitation feature amount and the delay time corresponding to the imitation action to calculate can be set.

The set number display column 2221 is a column for displaying the number of the types of the set imitation feature amounts.

The radio button 2222 is a button operated for setting the interaction feature amount. By operating the radio button 2222, input into the setting field group 2223 is enabled.

The setting field group 2223 includes a field for setting the type of the imitation feature amount, the type of the interaction feature amount, and the delay time. The setting field group 2223 may include another field. The delay time included in the setting field group 2223 is set in the delay time defining information 313.

The optimum delay time or delay time range calculated by using the GUI 2300 described later is set in the field of the delay time included in the setting field group 2223. Here, an expert may set a value by hand in the field of the delay time.

The condition setting column 2230 is a column for setting the condition of the imitation feature amount, including the set number display column 2231, the radio button 2232, and the setting field group 2233. By inputting a value in the condition setting column 2230, the output condition information 317 can be set.

The set number display column 2231 is a column for displaying the number of the set conditions.

The radio button 2232 is a button operated for setting the condition. By operating the radio button 2232, input into the setting field group 2233 enabled.

The setting field group 2233 includes the imitation feature amount type and the condition. The setting field group 2233 may include another field.

The learning processing setting column 2240 is a column for setting a learning method of the delay time, including a set display column 2241 and a set radio button group. By inputting a value in the learning processing setting column 2240, the learning method can be set.

This embodiment includes a radio button for selecting the presence or absence of the learning data and a radio button for selecting the learning data to use. The set display column 2241 displays the operation result of the set radio button group.

The biological signal setting column 2250 is a column for setting the biological signal and the index, including the set number display column 2251, the radio button 2252, and the setting field group 2253. By inputting a value in the biological signal setting column 2250, the biological signal to measure and the index to calculate can be set.

The set number display column 2251 is a column for displaying the number of the types of the set biological signals.

The radio button 2252 is a button operated for setting the biological signal. By operating the radio button 2252, input into the setting field group 2253 is enabled.

The setting field group 2253 includes a field for setting the biological signal type, activity, and index. The activity is a field for storing the identification information of an activity estimated based on the biological signal corresponding to the biological signal type. The index is a field for setting a relationship between the activity and the index. The setting field group 2253 may include another field.

The sympathy degree estimation setting column 2260 is a column for setting the index used for calculating the sympathy degree, including the set display column 2261 and the set radio button group. By inputting a value in the sympathy degree estimation setting column 2260, whether or not the sympathy degree is calculated at real time can be set.

This embodiment includes a radio button for selecting whether or not the sympathy degree is estimated at real time and a radio button for selecting the biological signal used for estimation. The set display column 2261 displays the operational result of the set radio button group.

The setting button 2270 of the delay time is a button for instructing the performance of the learning processing. When the button is operated, the learning module 104 performs the processing shown in FIG. 16 and the processing result is displayed as GUI 2300 shown in FIG. 23.

The save button 2275 is a button operated for saving the input of each setting column.

The GUI 2200 may include a button for switching the display mode and the edit mode.

The GUI 2300 shown in FIG. 23 is a GUI for setting the delay time or the delay time width based on the learning processing, including an imitation feature amount type selecting column 2301, an optimum delay time display column 2302, a delay time range display column 2303, a graph display column 2304, a set display column 2305, a fitting method setting column 2306, a set display column 2307, a learning data selecting column 2308, a set display column 2309, a calculation method setting column 2310, a set display column 2311, a delay time range calculation method setting column 2312, and a return button 2313.

The imitation feature amount type selecting column 2301 is a column for selecting the imitation feature amount corresponding to the imitation action to learn.

The optimum delay time display column 2302 is a column for displaying the optimum delay time calculated through the learning processing.

The delay time range display column 2303 is a column for displaying the delay time range calculated through the learning processing.

The graph display column 2304 is a column for displaying a graph indicating a relationship between the delay time and the sympathy degree.

The set display column 2305 is a column for displaying the operation result of the fitting method setting column 2306.

The fitting method setting column 2306 is a column for setting the fitting method. The fitting method setting column 2306 includes a radio button group for selecting the fitting method.

The set display column 2307 is a column for displaying the operational result of the learning data selecting column 2308.

The learning data selecting column 2308 is a column for selecting the data to use for learning. The learning data selecting column 2308 includes a radio button for selecting one of the personal data and the group data.

The set display column 2309 is a column for displaying the operational result of the calculation method setting column 2310.

The calculation method setting column 2310 is a column for setting the calculation method of the optimum delay time. The calculation method setting column 2310 includes a radio button for selecting whether or not the optimum delay time is calculated and a radio button for selecting a calculation reference of the optimum delay time.

The set display column 2311 is a column for displaying the operational result of the delay time range calculation method setting column 2312. As the calculation reference, the maximum value and the minimum value are displayed.

The delay time range calculation method setting column 2312 is a column for setting the calculation method of the delay time range. The delay time range calculation method setting column 2312 includes a radio button for selecting whether or not the delay time range is calculated and a radio button for selecting a calculation reference of the delay time. As the calculation reference, the ratio and the threshold are displayed. The values to set in the ratio and the threshold are changeable.

The return button 2313 is a button for switching to the GUI 2200.

By using the GUI 2200 and the GUI 2300, it is possible to set the information necessary for setting the delay time of the interaction feature amount, the imitation feature amount, and the biological signal at ease and to confirm and change the set values easily.

The invention is not restricted to the abovementioned embodiments but includes various modified examples. For example, in the abovementioned embodiments, the components have been described in detail to make it easy to understand the invention; however, it is not restricted to the structure having all the described components. Further, addition, deletion, and substitution are possible in some of the components in the embodiments.

Some or all of the abovementioned components, functions, processing units, and processing means may be realized by hardware, for example, in a way of being designed by an integrated circuit. Further, the invention can be realized by the program codes of software for realizing the function of the embodiments. In this case, a storing medium with the program codes recorded there is provided to a computer, and the CPU of the computer reads the program codes stored in the storing medium. The program codes themselves read from the storing medium are to realize the abovementioned functions of the embodiments, and the program codes themselves and the storing medium with the same codes stored constitute the invention. The storing medium for supplying the program codes includes, for example, flexible disk, CD-ROM, DVD-ROM, hard disk, Solid State Drive (SSD), optical disk, optical magnetic disk, CD-R, magnetic tape, nonvolatile memory card, and ROM.

The program codes of realizing the functions described in the embodiments can be installed by the programming language in a wide range, for example, assembler, C/C++, perl, Shell, PHP, Java (registered trademark) or a script language.

Further, the program codes of the software of realizing the functions of the embodiments are delivered through a network and stored in a storing means such as a hard disk or a memory of a computer or a storing medium such as CD-RW and CD-R, and the CPU of a computer may read the program codes stored in the storing means or the storing medium to execute the same.

In the abovementioned embodiments, control lines and information lines are shown depending on the necessity for the sake of explanation; all the control lines and the information lines in the product are not necessarily shown. All the components may be mutually coupled.

What is claimed is:

1. An interactive system for providing an interactive interface which performs an interaction with a user, comprising:
 a computer including an arithmetic unit, a storage unit coupled to the arithmetic unit, and an interface coupled to the arithmetic unit; and
 a measurement device to measure a signal related to speech of the user,
 wherein the arithmetic unit:
 calculates a first feature amount indicating a feature of a user action in the speech of the user, based on the signal measured by the measurement device;
 calculates a second feature amount that is a control value of a response action to the user performed by the interactive interface, based on the first feature amount;
 calculates a control time of adjusting a timing of controlling the response action, depending on a type of the response action; and
 controls the interactive interface, based on the second feature amount and the control time,
 wherein the storage unit holds control time defining information to manage control times set for every type of the response action,
 wherein the arithmetic unit calculates the control time of the response action, based on the control time defining information,
 wherein the control time defining information contains an entry including the type of the response action and a set range of possible control times for the type of the response action, and
 wherein the arithmetic unit selects a random control time from within the set range of the possible control times for the type of the response action as the control time for controlling the response action,
 wherein the storage unit holds history information to manage history of the response actions performed by the interactive interface,
 wherein the history information includes an index indicating effectiveness of the response action, and
 wherein the arithmetic unit:
 analyzes a relationship between the index and the control time, with reference to the history information; and
 updates the control time defining information, based on a result of analyzing the relationship between the index and the control time.

2. The system according to claim 1,
 wherein the storage unit holds condition information to manage execution conditions of the response action, and
 wherein the arithmetic unit controls the interactive interface, based on the second feature amount, the control time, and the condition information.

3. The system according to claim 1,
 wherein the arithmetic unit:
 calculates an index indicating effectiveness of the response action, based on the signal measured by the measurement device; and
 calculates the control time, based on the first feature amount and the index.

4. The system according to claim 1,
 wherein the response action is an action of imitating the action of the user, and
 wherein the control time is a delay time.

5. A control method of an interactive system for providing an interactive interface which performs an interaction with a user,
 wherein the interactive system is provided with a computer including an arithmetic unit, a storage unit coupled to the arithmetic unit, and an interface coupled to the arithmetic unit, and a measurement device to measure a signal related to speech of the user,
 the control method comprising the following steps of:
 calculating a first feature amount indicating feature of a user action in the speech of the user, based on the signal measured by the measurement device, by the arithmetic unit;
 calculating a second feature amount that is a control value of a response action to the user performed by the interactive interface, based on the first feature amount, by the arithmetic unit;
 calculating a control time of adjusting a timing of controlling the response action, depending on a type of the response action, by the arithmetic unit; and
 controlling the interactive interface, based on the second feature amount and the control time, by the arithmetic unit, wherein the storage unit holds control time defining information to manage the control times set for every type of the response actions, wherein the delay time calculating step further includes a step of calculating the control time of the respective response action, based on the control time defining information, by the arithmetic unit, wherein the control time defining information contains an entry including a type of the response action and a set range of possible control times for the type of the response action, and wherein the delay time calculating step further includes a step of selecting, by the arithmetic unit, a random control time from within the set range of the possible control times for the type of the response action as the control time for controlling the response action, wherein the storage unit holds history information to manage history of the response actions performed by the interactive interface, and wherein the history information includes an index indicating effectiveness of the response action, the control method further comprising the steps of:

analyzing a relationship between the index and the control time, with reference to the history information, by the arithmetic unit; and updating the control time defining information, based on a result of analyzing the relationship between the index and the control time, by the arithmetic unit.

6. The method according to claim 5, wherein the storage unit holds condition information to manage execution conditions of the response action, and wherein the controlling step further includes a step of controlling the interactive interface, based on the second feature amount, the control time, and the condition information.

7. The method according to claim 5, further comprising a step of calculating an index indicating effectiveness of the response action, based on the signal measured by the measurement device, by the arithmetic unit, wherein the delay time calculating step further includes a step of calculating the control time, based on the first feature amount and the index, by the arithmetic unit.

8. The method according to claim 5, wherein the response action is an action of imitating the action of the user, and wherein the control time is a delay time.

9. A device for providing an interactive interface which performs an interaction with a user, comprising:

an arithmetic unit;

a storage unit coupled to the arithmetic unit;

an interface coupled to the arithmetic unit; and a measurement unit to measure a signal related to speech of the user, wherein the storage unit holds delay time defining information to manage delay times for adjusting a timing of controlling response actions, in every type of the response actions to imitate actions of the user, performed on the user by the interactive interface, and wherein the arithmetic unit:

calculates a first feature amount indicating feature of the user action in the speech of the user, based on the signal measured by the measurement unit;

calculates a second feature amount that is a control value of the response action to the user performed by the interactive interface, based on the first feature amount;

calculates the delay time depending on the type of the response action, based on the delay time defining information; and controls the interactive interface, based on the second feature amount and the delay time, wherein the storage unit holds control time defining information to manage the control times set for every type of the response actions, wherein the arithmetic unit calculates the control time of the response action, based on the control time defining information, wherein the control time defining information contains an entry including the type of the response action and a set range of possible control times for the type of response action, and wherein the arithmetic unit selects a random control time from within the set range of the possible control times for the type of the response action as the control time for controlling the response action, wherein the storage unit holds history information to manage history of the response actions performed by the interactive interface, wherein the history information includes an index indicating effectiveness of the response action, and wherein the arithmetic unit:

analyzes a relationship between the index and the control time, with reference to the history information; and updates the control time defining information, based on a result of analyzing the relationship between the index and the control time.

* * * * *